United States Patent
Tedesco

(10) Patent No.: US 7,058,622 B1
(45) Date of Patent: Jun. 6, 2006

(54) METHOD, APPARATUS AND SYSTEM FOR SCREENING DATABASE QUERIES PRIOR TO SUBMISSION TO A DATABASE

(76) Inventor: Michael A. Tedesco, 203 Dickenson Dr., Shelton, CT (US) 06484-1698

( * ) Notice: Subject to any disclaimer, the term of this patent is extended or adjusted under 35 U.S.C. 154(b) by 199 days.

(21) Appl. No.: 10/034,885

(22) Filed: Dec. 26, 2001

(51) Int. Cl.
    *G06F 17/30* (2006.01)
(52) U.S. Cl. .................... 707/2; 707/9; 707/10
(58) Field of Classification Search .............. 707/1–10
    See application file for complete search history.

(56) References Cited

U.S. PATENT DOCUMENTS

| | | | | |
|---|---|---|---|---|
| 6,330,552 B1* | 12/2001 | Farrar et al. ............... | 705/400 |
| 6,353,818 B1* | 3/2002 | Carino, Jr. ................. | 707/2 |
| 6,438,741 B1* | 8/2002 | Al-omari et al. ........... | 707/2 |
| 6,487,552 B1* | 11/2002 | Lei et al. ................... | 707/4 |
| 6,618,719 B1* | 9/2003 | Andrei ....................... | 707/2 |
| 6,714,938 B1* | 3/2004 | Avadhanam et al. ...... | 707/102 |
| 6,820,073 B1* | 11/2004 | Bedell et al. ............... | 707/2 |
| 6,938,035 B1* | 8/2005 | Driesch et al. ............ | 707/3 |
| 2003/0061215 A1* | 3/2003 | Messina | |
| 2003/0065648 A1* | 4/2003 | Driesch, Jr. et al. | |
| 2003/0182276 A1* | 9/2003 | Bossman et al. .......... | 707/3 |

* cited by examiner

*Primary Examiner*—Debbie M. Le
(74) *Attorney, Agent, or Firm*—Morgan & Finnegan, LLP; Tony V. Pezzano

(57) ABSTRACT

To maintain the integrity and operability of enterprise database systems, queries intended for a particular database engine are intercepted, preferably by a separate processing system, prior to being acted upon by the database engine. The query is evaluated to determine its projected impact on available database system resources. The variables evaluated include user rights, administrator-imposed limits to searches, the amount of presently-available system resources, the cost of query and the like. If the query's potential impact does not surpass a predetermined threshold, it is submitted to the search engine. If the query is too resource-intensive or costly, the query may be (i) optimized by a query-optimization system, (ii) stored until more system resources are available, or (iii) rejected.

153 Claims, 17 Drawing Sheets

METHOD, APPARATUS AND SYSTEM FOR SCREENING DATABASE QUERIES PRIOR TO SUBMISSION TO A DATABASE

FIELD OF THE INVENTION

The present invention relates generally to database management and, more particularly, to query processing.

BACKGROUND OF THE INVENTION

An enterprise database engine typically contains a large amount of searchable data that may be needed extensively by a business on a daily basis. For example, a large group of marketing professionals in one company may submit large numbers of queries on a daily basis to an internal customer profile database to determine patterns in the profiles of the company's customers, based on data stored from customer transactions and the like. In addition, many database services are provided over the Internet to subscriber/users who, in turn, may simultaneously submit varied database queries that require extensive system resources to process.

A problem arises in that many ordinary and intended users who are authorized to access such databases are not knowledgeable in optimizing queries to retrieve desired data. Queries may be submitted that contain excessive query arguments that provide no further data than an optimized query would. Additionally, poorly constructed queries may return an unexpectedly large number of results or result sets. This may be due to, for example, unintentional selection of overly-broad search criteria. A plethora of other examples exists in which queries may needlessly impact system resources in a negative manner.

Such negative-impact queries can disrupt system resources, thereby preventing the timely processing of other queries, and fostering a significant business cost in terms of man hours, efficiency and database administration to any company employing such enterprise databases. Nonetheless, the overall business trend witnessed over the past decade is to provide greater access to database resources to an increasing set of authorized users, even in light of these difficulties.

Recognizing the problems above, many database systems have employed certain techniques to reduce disruption caused by negative impact queries. For example, some database search engines provide a maximum limitation on the number of reportable results in reply to a user query. However, such systems process the query first and then limit the output of results. In such case, the database system has already processed a substantial amount of the negative impact query, thereby impacting available system resources to a certain degree. Thus, in such systems, impact on system resources has at best been reduced; such systems cannot, by design, prevent altogether the processing of poorly constructed queries. In another existing method of query management, an access limit is set based solely on a class of the user submitting the query. In such systems, certain users may be limited to accessing only specific database records as compared to other users. However, such systems run counter to the current trend of allowing greater database accessibility, and further do not take into account the impact of system resources of an authorized query. Thus, users of any class may continue to submit negative impact queries to these systems.

Further types of existing systems monitor system usage and simply deny access to additional users when system usage values have been exceeded. However, by their nature, such systems first allow system resources to be unduly impacted.

Yet further types of query management systems optimize query parameters by, for example, providing further search terms of similar definition to user-submitted search terms. Other queries may optimize queries by identifying and correcting unrecognizable search commands or logical arguments. These query optimization systems, however, do not typically account for system usage when determining manners in which to optimize user queries.

Accordingly, there is a need for a method and apparatus for screening database queries that addresses certain problems of existing technologies.

SUMMARY OF THE INVENTION

The present application is directed to particular features of a system for screening queries on a query-by-query basis to evaluate potential impact on system resources, as well as evaluating queries in traditional manners. In one aspect of the invention, a method and apparatus for controlling access to database information includes receiving a database query generated by a user and directed to a database engine. The query is evaluated to determine system usage, prior to submission of the query to the database engine. The query is rejected if the projected system usage surpasses a threshold value.

In a second aspect of the present invention, a method and apparatus for controlling access to database information includes receiving a database query generated by a user and directed to a database engine. The query is evaluated to determine system usage, prior to submission of the query to the database engine. The query is then submitted to the database engine if the system usage does not surpass a threshold value.

In a third aspect of the present invention, a method and apparatus for controlling access to database information includes receiving a database query generated by a user and directed to a database engine. The query is evaluated against its projected system usage, prior to submission to the database engine. The query is edited or substantially optimized to reduce impact on system resources if the projected system usage surpasses a threshold value.

In a fourth aspect of the present invention, a method and apparatus for controlling access to database information includes receiving a database query from a user and directed to a database engine. The query may be evaluated to determine its system usage prior to submission to the database engine. If the system usage surpasses a threshold value, the system of the present embodiment may perform at least one of the following: submit the query to the database engine with a limit on a number of returns responsive to the query, edit the query to reduce system usage, or reject the query.

In a fifth aspect of the present invention, a method for querying a database includes transmitting a query to a database engine and receiving one of: (i) a rejection of the query and (ii) a revised search criterion, prior to receiving a search result from the database engine. The rejection or revised search criteria may be generated by a screening server that intercepts the query. Alternatively, the rejection or revised search criteria may be received prior to submission of the query to the database engine.

In a further embodiment of the present invention, a method and apparatus for selectively controlling queries to a database includes establishing a threshold value for projected system usage for a database query and activating a query screening process for a database engine. The screening process is used to preserve system resources prior to submission of queries to the database engine.

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

Figure 1:
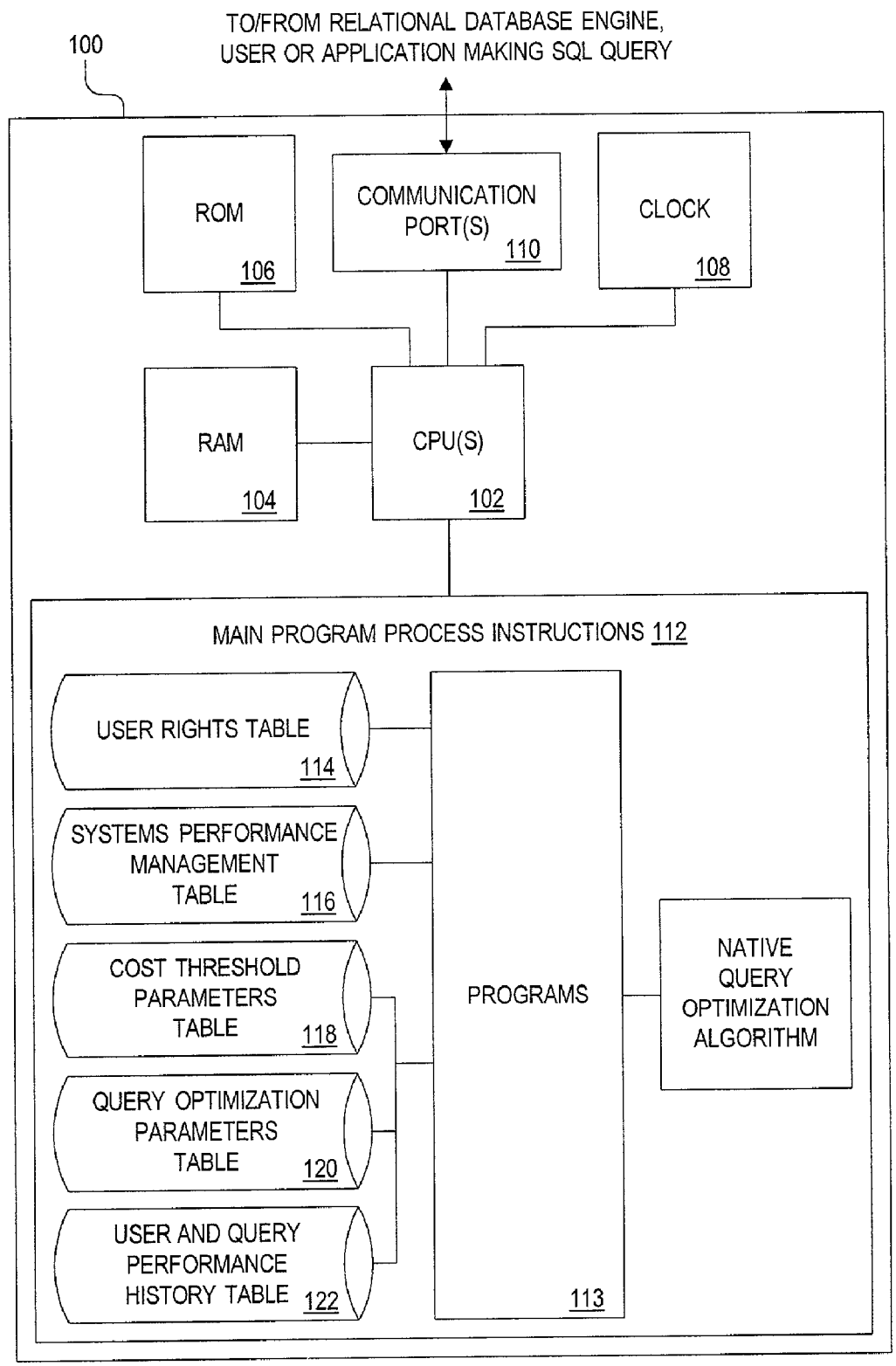
FIG. 1 is a schematic block diagram of an exemplary server for screening queries in accordance with certain embodiments of the present invention.

A system of the present invention is operative to intercept an individual query containing search parameters and logical arguments, and dynamically process the same on a query-by-query basis to determine its projected impact on system resources of a database engine that will process the query. Groups of such queries may be intercepted and evaluated in this manner. The resources to be evaluated may include: (i) a number of relational databases to be utilized in fulfilling the query, (ii) a size of the data fields and number of rows and/or columns to be searched for the query, (iii) an availability of hardware resources (such as processing time, memory, input/output transfer rates and disk space usage) of a system maintaining the database, (iv) a number of relational database tables to be employed for the query, (v) a limitation to be imposed on a size of a query result set, a number of rows and/or columns of data to be returned in a query result set, (vi) a cost of a previously-stored query with similar parameters and (vii) a number of function calls employed by the query.

Individual query parameters may be evaluated during the screening process performed by the present system. For example, query parameters, such as search terms and logical arguments, may be in a structured query language (SQL) format, or other similar database query formats. The query parameters may be optimized by available third-party query optimization tools known to those of ordinary skill in the art. When multiple tools are available, the system of the present invention may select one of such tools for performing query optimization, based on historical performance of the tools or by intended performance improvements of the tools.

The user rights of the user submitting the query may also be evaluated by the present system. The user rights may include an assigned accessibility right of a user, based on a class or category of a user. In addition, user rights may be based on historical system resource requirements of the user's previous queries, and further, upon the historical scores of the user's previously evaluated queries.

In various embodiments of the present invention, all such evaluations described above must take place prior to submission of the query to the database engine. In some embodiments, the query is submitted by a user terminal to a database engine, and intercepted and analyzed by a separate screening server prior to receipt by the database engine. In this manner, the screening server may save utilization of the system resources of the database engine by first evaluating the query.

Queries that are intercepted and screened in any or all of these manners may be assigned a final impact rating. The rating may be determined, for example, by identifying the various system resources that may be impacted impacted, assigning a weight to each impacted resource, and generating a score reflective of the results. Other useful weighted computational models may also be used. The generated rating is then compared to one or more threshold values set by a database administrator, determined by an analysis of available system resources, or the like.

If the rating surpasses the threshold value, the query may be rejected. Alternatively, the screening server may negotiate or assign a limited result set to be provided in response to the query. This limitation is then communicated to the database engine upon submission of the query. If, on the other hand, the rating does not surpass the threshold value, the query may be submitted to the database engine for processing. The result sets generated by the database engine in response to the query may then be communicated to the user by either the database engine or the screening server. In the latter case, the query parameters may nonetheless be optimized by the previously described third-party optimization tools prior to submission to the database engine.

In various embodiments, the system of the present invention can optionally prioritize and queue queries for the database engine based on the priority of the query or the user submitting the query. The system may further pause processing of lower priority queries so that higher priority queries may be processed and/or completed first.

Referring now to FIGS. 1–7J, wherein similar components of the present invention are referenced in like manner, preferred embodiments of a method and apparatus for screening database queries prior to submission to a database are disclosed.

In FIG. 1, displayed therein are exemplary components of a computing device, such as a screening server 100. It should be understood that any computing device described herein may share similar configurations to screening server 100. However, for sake of brevity, the discussions of hardware components used by various devices herein will be made in reference to the screening server 100 only.

The primary component of the screening server 100 is a central processing unit (CPU) or microprocessor 102, which may be any commonly available microprocessor, such as the SunSPARC family of processors manufactured by SUN MICROSYSTEMS. The CPU 102 may be operatively connected to further exemplary components, such as random access memory (RAM) 104, read-only memory (ROM) 106, a clock 108, input/output devices such as communication port(s) 110, and a memory 112. The memory 112, in turn, may store one or more application and operating system programs 113, a user rights table 114, a system performance management table 116, a cost threshold parameters table 118, a query optimization parameters table 120 and a user and query performance history table 122.

The CPU 102 operates in conjunction with RAM 104 and ROM 106 in a manner well known in the art. The RAM 104 may be a suitable number of Single In-line Memory Module (SIMM) chips having a storage capacity (typically measured in kilobytes or megabytes) sufficient to store and transfer, inter alia, processing instructions utilized by the CPU 102, that in turn may be may be received from the application programs 113. The ROM 106 may be any permanent, non-rewritable memory medium capable of storing and transferring, inter alia, processing instructions performed by the CPU 102 during a start-up routine of the screening server 100.

The clock 108 may be an on-board component of the CPU 102 which dictates a clock speed (typically measured in MHz) at which the CPU 102 performs and synchronizes, inter alia, communication between the internal components of the screening server 100.

The communication port(s) 110 may be one or more commonly known devices used for receiving system operator inputs, network data, and the like and transmitting outputs resulting therefrom. Accordingly, exemplary input devices may include a keyboard, a mouse, a voice recognition unit and the like for receiving inputs from an operator of the screening server 100. Additionally, output devices may include any commonly known devices used to present data to an operator of the screening server 100 or to transmit data over the computer network 200, described further below. Accordingly, suitable output devices may include a display, a printer and a voice synthesizer connected to a speaker. Other output devices may include a telephonic or network connection device, such as a communication port, a telephone modem, a cable modem, a T-1, T-2 or T-3 connection, a digital subscriber line or a network card, or any other device for communicating data to and from other computing devices over the computer network 200. In an environment in which high numbers of users are involved, it is preferred that the communications devices used as communication ports 110 have capacity to handle high bandwidth traffic in order to accommodate communications with a large number of users.

The memory 112 may be an internal or external large capacity device for storing computer processing instructions, computer-readable data, and the like. The storage capacity of the memory 112 is typically measured in megabytes or gigabytes. Accordingly, the memory 112 may be one or more hard disk drives and/or any other computer readable medium that may be encoded with processing instructions in a read-only or read-write format. Further functions of and available devices for memory 112 will be apparent.

The memory 112 preferably stores, inter alia, a plurality of application programs 113 which may be any one or more of an operating system such as LINUX, and one or more application programs, such as a web hosting program and a database management program of the type manufactured by ORACLE, each of which may be necessary to implement various embodiments of the present invention. In an Internet environment, web hosting software may include functionality sufficient to read JAVASCRIPT, hyper-text markup language (HTML), extensible markup language (XML) and other similar programming languages typically used in conjunction communicating data between clients and servers over the Internet.

In any type of network environment, the application programs 113 may also include a database management program, of the type commonly manufactured by ORACLE CORP. to store and maintain various databases as described below at the screening server 100 in order to implement certain aspects of the invention. For example, the database programs may be used to maintain the user rights table 114, the system performance management table 116, the cost threshold parameters table 118, the query optimization table 120, the user and query performance history table 122. Further or fewer database may be used in certain embodiments. The databases presented herein may be configured into any number of relational databases. In addition, configurations other than database formats may be used to store the data maintained in these exemplary databases.

Figure 2:
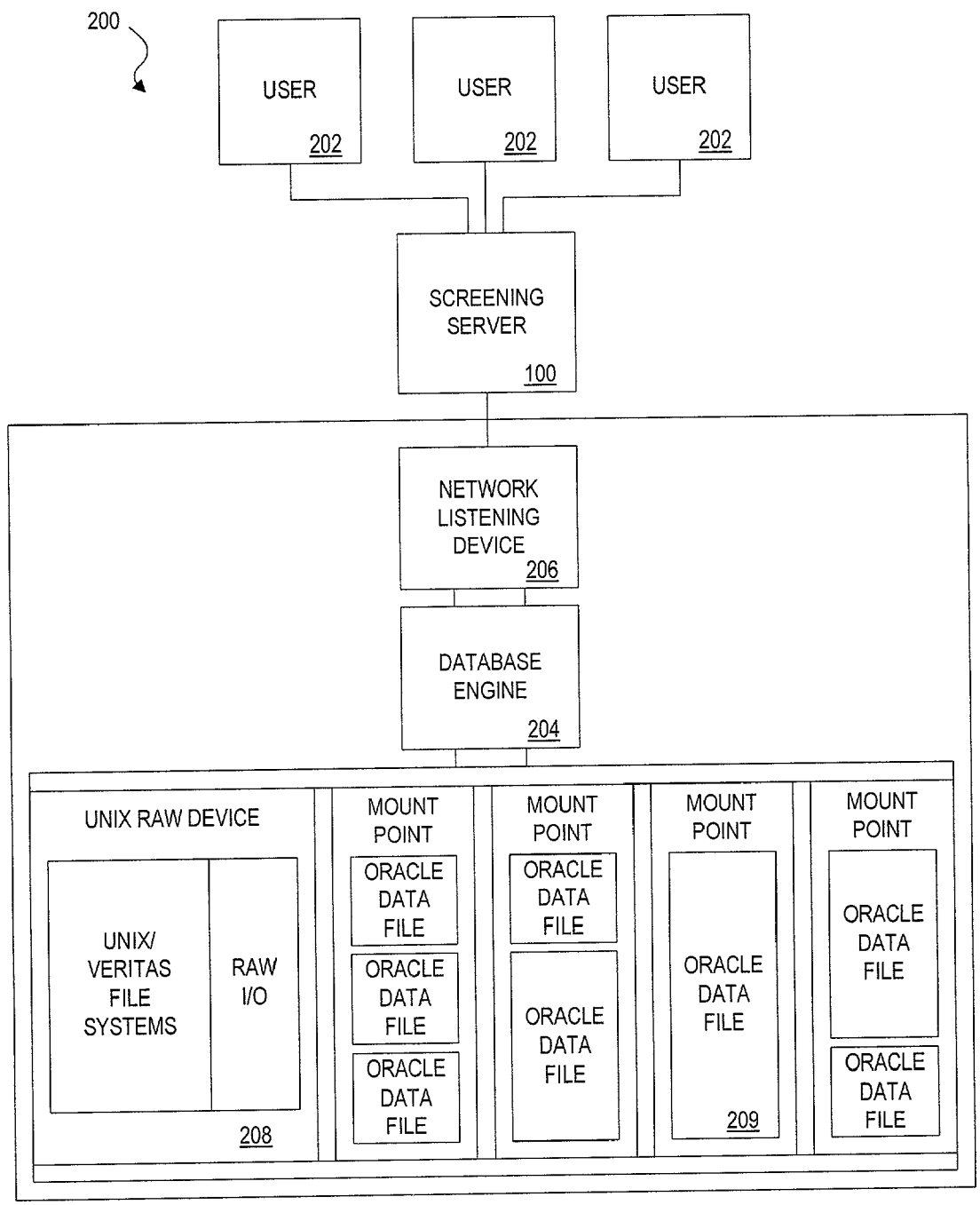
FIG. 2 is a diagram of a first exemplary network including the server of FIG. 1.

Turning now to FIG. 2, there is depicted a first exemplary computer network 200 through which a plurality of users operating user terminals 202 may communicate with one or more database engines 204 through screening server 100. Computer network 200 may be an Internet-based network such as the World Wide Web, a local area network (LAN), a wide-area network (WAN), an intranet environment, an extranet environment, or any other type of wired, wireless, or hybrid computer networks.

User terminals 202 may each be any type of computing device, such as a personal computer, a workstation, a network terminal, a hand-held remote access device, a personal digital assistant (PDA) or any other device that can accomplish two-way electronic communication over the network 200. Users may run a web browser or the like on user terminal 202 to communicate with the screening server 100 over the Internet.

The database engine 204 may be a single server or group of distributed servers. The database engine may be operative in conjunction with a network listening device 206 for receiving submitted queries. In a UNIX environment, the database engine 204 may be in further communication with other UNIX processing devices 208, and an electronic data repository 209 for storing one or more massive database files utilized by the database engine. The database engine 204 may store database management software, relational database tables for stored databases, index files for stored databases, and the like, the functions of which are readily known to one of ordinary skill in the art.

Further specific functions and operations of user terminals 202, screening server 100, and database engine 204 are discussed further below.

Figure 3:
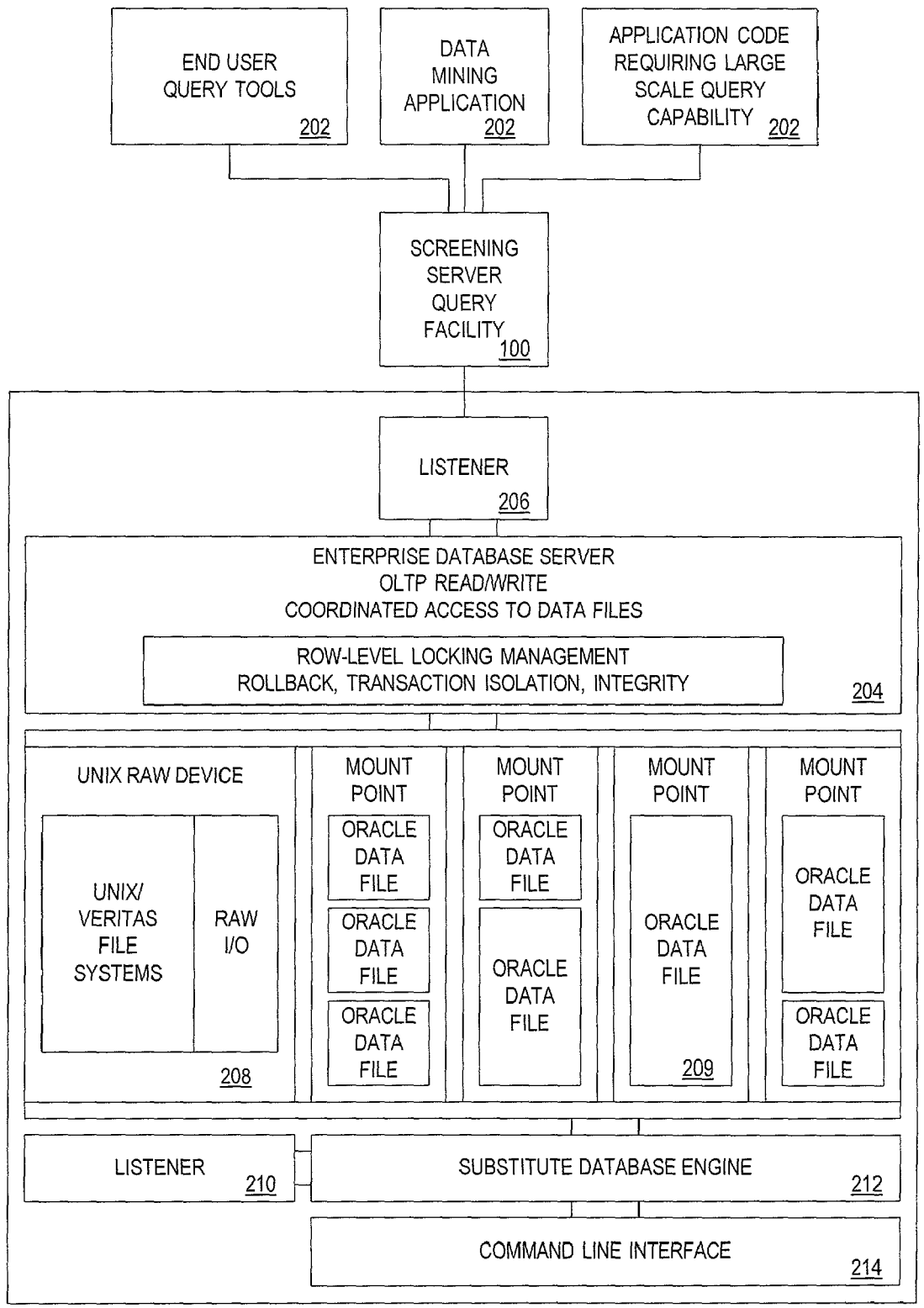
FIG. 3 is a diagram of a second exemplary network including the server of FIG. 1.

In FIG. 3, there is depicted a second exemplary network configuration for the network 200, in which the database engine 204 is in further operative communication with a substitute database engine 212 that emulates or substitutes the functionality of the database engine 204. This substitute database engine 212 may be utilized by the operator of the database engine to handle certain queries directed to the database engine after the queries have been evaluated according to the present invention. The substitute database engine 212 may use an alternate database engine capable of accessing and generating result sets for queries to the database maintained by the database engine 204. The substitute database engine 212 may be in operative communication with a listening device 206 for receiving redirected queries and a command line interface 214 for processing the query and returning results of the query to a user.

Figure 4:
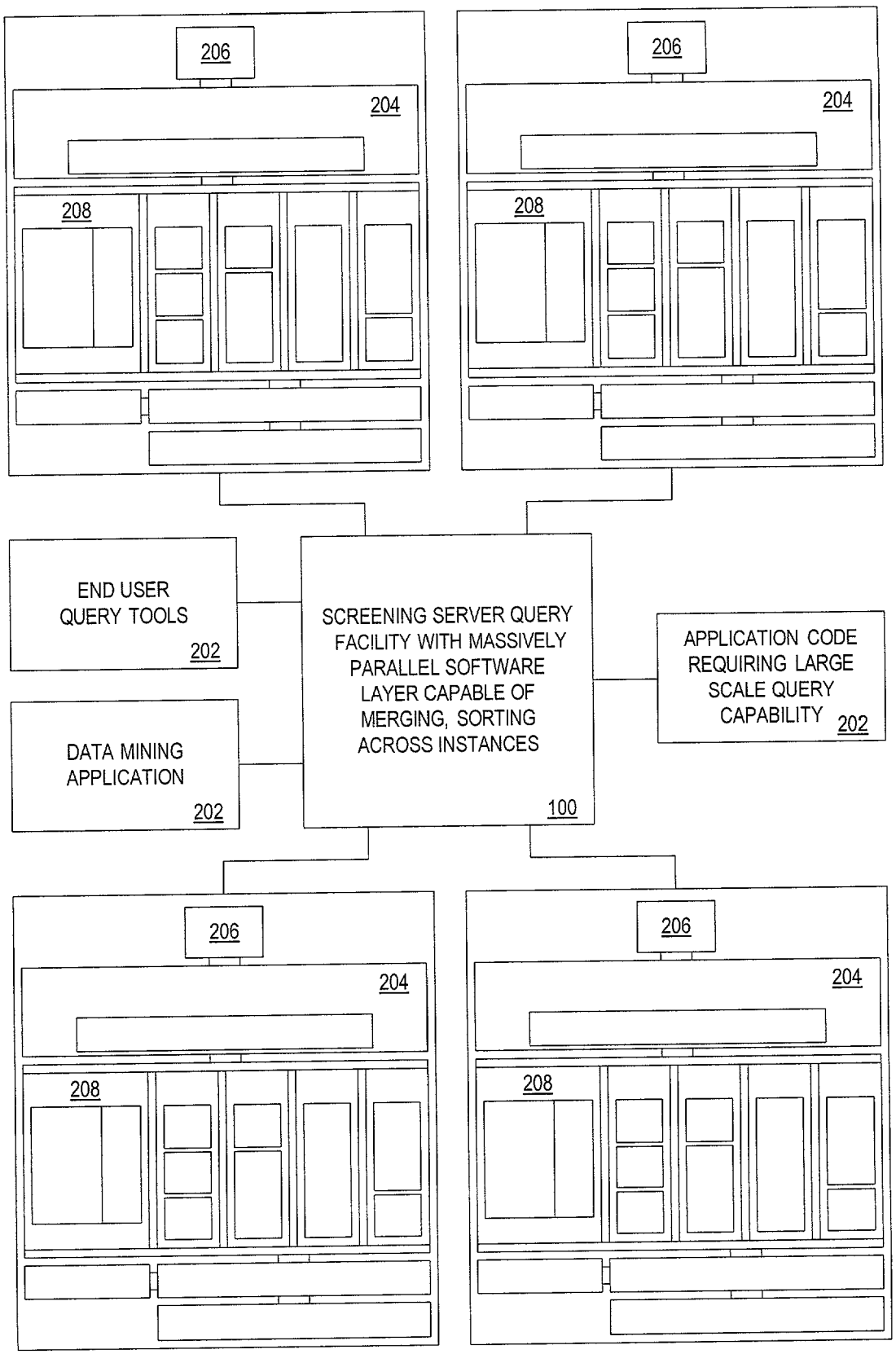
FIG. 4 is a diagram of a third exemplary network including the server of FIG. 1.

In FIG. 4, there is depicted a third exemplary configuration for the network 200 in which the screening server 100 is in operative communication with a plurality of database engines 204.

Figure 5:
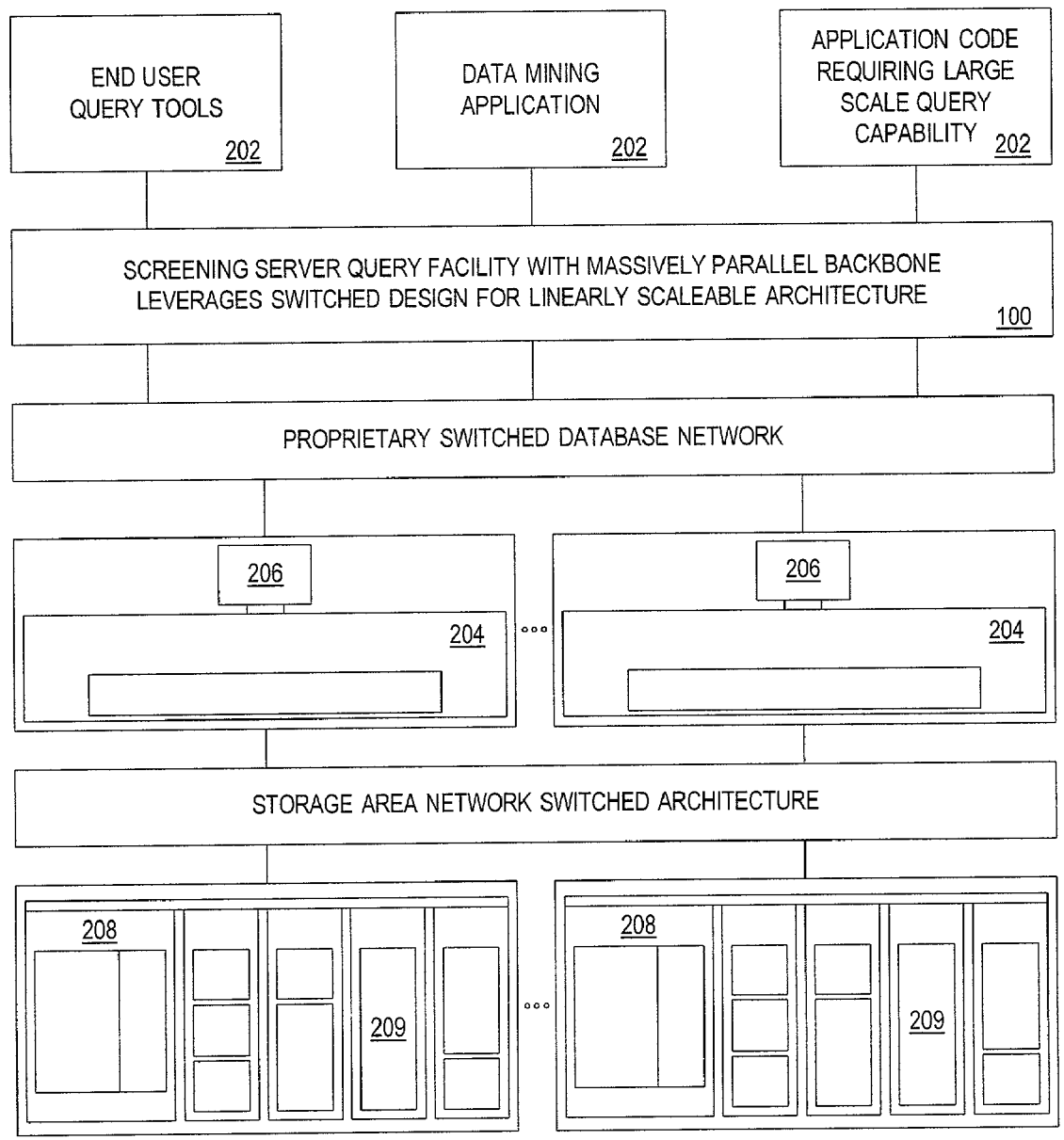
FIG. 5 is a diagram of a fourth exemplary network including the server of FIG. 1.

In FIG. 5, there is depicted a fourth exemplary network configuration for network 200, in which the screening processor 100 is in operative communication with a massively parallel proprietary switched database network containing a plurality of database engines 204. In addition, the database engines 204 may be in operative communication with a storage area network switched architecture containing a plurality of UNIX raw devices 208 and data files 209.

Other operative network configurations are readily contemplated to be employed by the present invention.

Figure 6A:
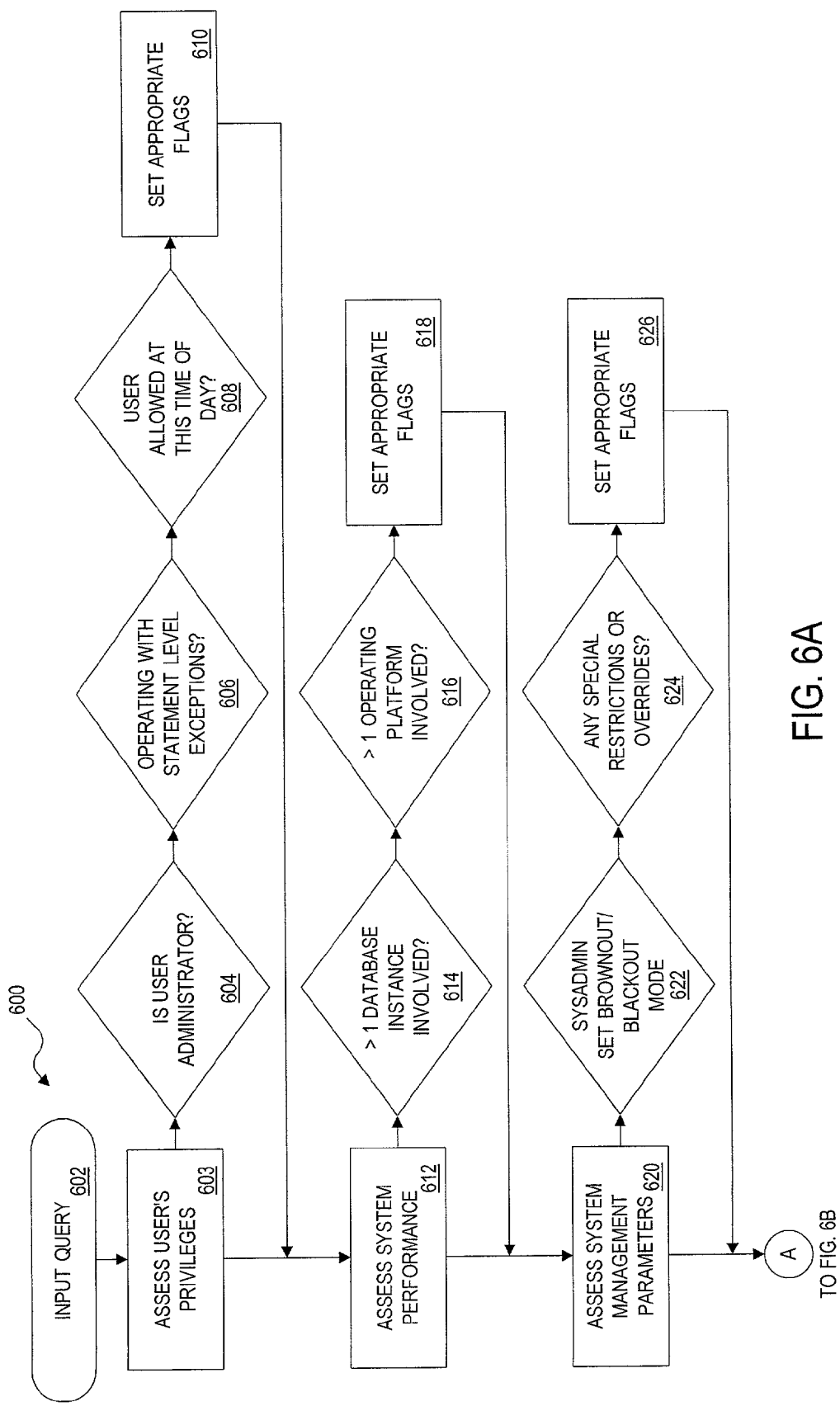
FIGS. 6A–6B are flowcharts depicting an exemplary general process for screening queries in accordance with certain embodiments of the present invention.
Figure 6B:
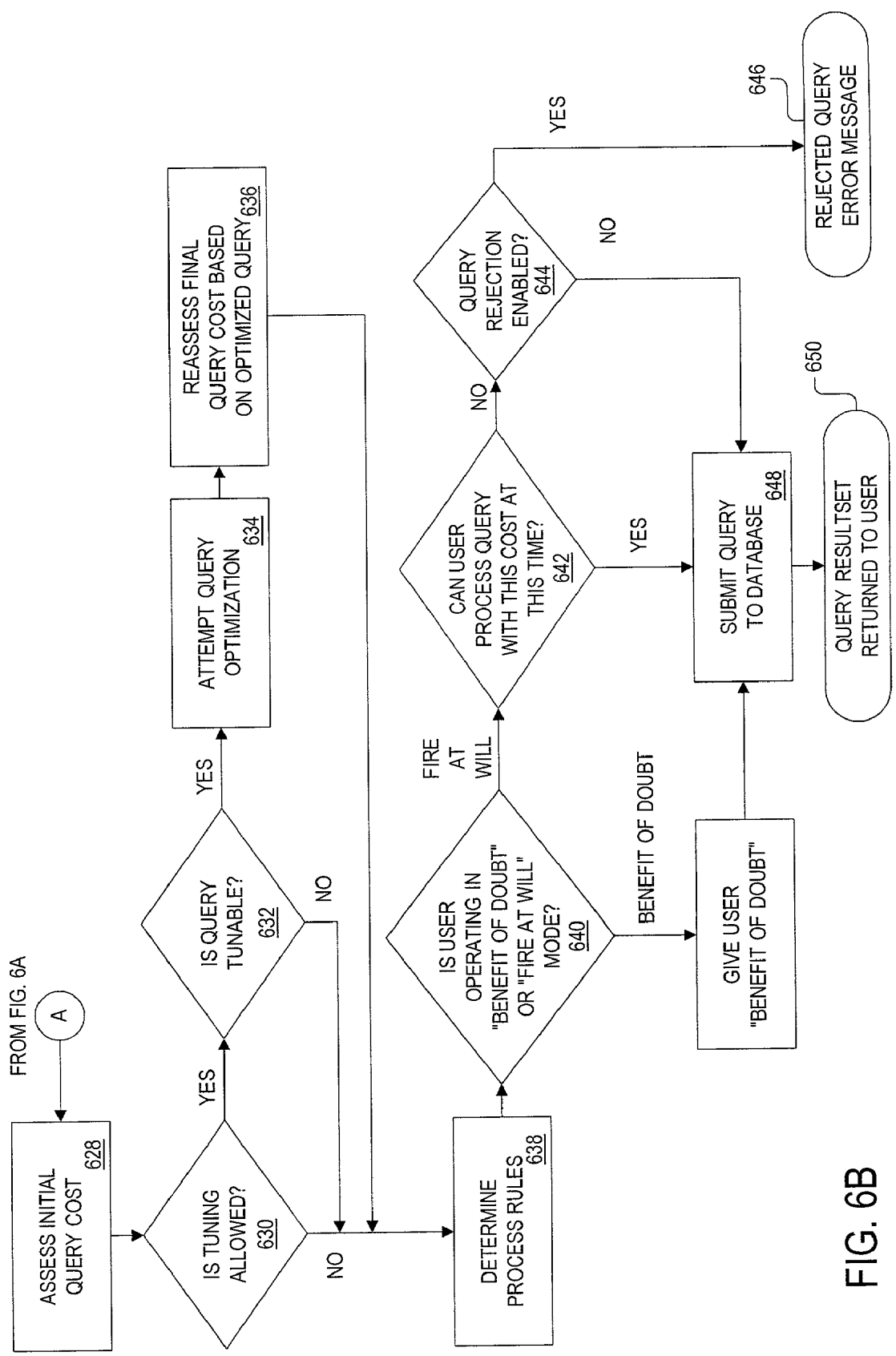

Turning now to FIGS. 6A–6B, therein is depicted a flowchart of an exemplary general process 600 for database screening, performed for example by a screening server 200, according to certain embodiments of the present system. The process 600 begins when a query is submitted by a user to the database engine (step 602). The system intercepts the query, receives an identification of the user and accesses the user rights table 114 to determine the user privileges of the user (step 603). The user rights table may store, for example, an identification of the user and user access rights. In various embodiments, it is possible to allow or disallow access to users who are not listed in the user rights table 114.

Next, the system determines whether (i) the user is an administrator of the system or other high-priority user (step 604), (ii) if the user is operating with statement level exceptions (step 606) and (iii) if the user is allowed to use at this time of day (step 608). This information may be determined from the access of the user rights table described previously above, or in any other known manner. If any of the conditions from steps 604–608 are true, the system sets appropriate flags (step 610) which are used later in the process to determine whether to reject, allow or edit a query submitted by the user.

Continuing with the process 600, the system may next access system performance parameters and thresholds established, for example, for the database engine 204 (step 612). The system may determine whether there is more than one database instance involved (step 614) and whether there is more than one operating platform (e.g. WINDOWS, MACINTOSH and UNIX) involved in processing the query (step 616). These factors may negatively impact the processing of the query, thereby impacting processing performance by the database engine. If any of these conditions exist, the system sets appropriate flags for the query (step 618). The system next assesses database management parameters, for example, by accessing the system performance management table 116 which may store, inter alia, performance parameters of the database engine 204 (step 620). The system performance management table 116 may accordingly store such parameters as (i) processor speed and usage, (ii) available memory, (iii) available input/output resources, (iv) usage and disk resources and usage, and (v) preferences set by an administrator of the database engine 204. These parameters may be dynamically updated based on the current operating conditions of the database engine 204.

Continuing with the process 600, the system server may determine whether the administrator set "brownout" and/or "blackout" modes for the database engine, by which access to the database is limited or denied altogether at, for example, predetermined times of day (step 622). The system may further determine whether there are any other special restrictions or overrides (step 624). If such conditions exist, the system sets appropriate flags for the query (step 626).

Referring now to FIG. 6B, the system next determines an initial query processing cost based on various parameters of the query (step 628). Such cost may be determined based on estimated or actual processor time, and the corresponding cost of that time as may be determined from the following exemplary parameters: a logical argument or search criterion of the query, a number of relational databases employed by the query, a size of a data field to be searched for the query, an availability of resources of a system maintaining the database engine, a number of relational database tables to be employed by the query, any limitation imposed on a size of a query result set, a number of rows and/or columns of data to be returned in a query result set, a cost of a previously-submitted query and a number of function calls employed by the query. A permissible cost for a query may be stored and retrieved in the cost threshold parameters table 118. The table 118 may store acceptable costs for queries as a whole or for each tokenized component of a query.

The system next determines if tuning or optimization of the query is allowed (step 630). In some instances, such as in the case of a query by high-level authorized user, the query may not be allowed to be reconfigured by the system. Nonetheless, if the query may be optimized, the process 600 continues to step 632. Otherwise, the process continues to step 638 further below.

If query optimization is allowed, the system examines the query to determine whether the query has arguments or search terms that may be optimized (step 632). This may be accomplished through use of a variety of available query optimization products. If the query can be optimized, the process continues to step 634. Otherwise, the process 600 continues to step 638 further below.

The system then performs optimization on the query by modifying query arguments and search terms, reducing redundancies in the search request, and the like (step 634). The system then determines a final query cost based on optimized query, based on the same factors used to analyze query cost for the original query (step 636). The difference in processing costs of the original and optimized query may be used to determine whether it is desirable to submit the optimized query, as discussed further below with respect to FIGS. 7A–7J. For example, the original query may be submitted to the database engine, even if it can be optimized if the usage of the database engine is low or the cost savings is not significant.

Next, at step 638, the system determines any applicable process rules, such as a limitation on queries that are over a predetermined cost or time of day limitations on query processing, as discussed later in the following discussions, and will reject a query if such processing rules are violated by the query.

The system then determines whether the user that submitted the query is operating in a "benefit of the doubt" or "fire at will" mode (step 640). In benefit-of-the-doubt mode, any query submitted by the user will be accepted. The mode may be determined by the user's access rights and stored in an appropriate field of user rights table 114. For example, a high-level user may be granted database access in this mode. If the user is operating in the "benefit-of-the-doubt" mode, the process 600 continues to step 648 below.

The "fire-at-will" mode may be one or more conditions which, aside from the query cost per se, will prevent submission of the query to the database. For example, if the database engine is experiencing a backlog in submitted queries or other similar processing delay, all queries, or queries from particular classes of users may be rejected, conditionally on the query's projected cost. If the system is in "fire-at-will" mode, the process continues to step 646, where a query rejection message is sent to the user.

If neither the "fire-at-will" nor the "benefit-of-the-doubt" modes are applicable, the process 600 continues to step 642 where the system determines whether the user can process the query based on the final cost. In some instances, this determination may be based on the cost of the optimized query or the cost of the original query. If the query can be processed, the process 600 continues to step 648 below. If not, the system determines whether query rejection has been enabled (step 644). If query rejection is enabled, the process continues to step 646, described above.

At step 648 the query is submitted to the database engine and a result set based on the query is returned. The result set, or a portion thereof, may then be provided to the user (step 650), after which the process 600 ends.

Turning to FIGS. 7A–7J, a detailed process 700 is depicted for screening and optimizing database queries. The process 700 begins at step 702 when a query is received from a user by the system of the present invention, for example, the screening server 200. The system reads the user's privileges from the user rights table 114 (step 704), determines the user's threshold value for query processing based on the privileges (step 706), determines whether any time of day restrictions are applicable (step 708) and determines any other applicable user access rights (step 710).

The system further determines whether the user is an administrator of the database engine (step 712). If so, an administrator flag is set at step 714. Thereafter, the process 700 continues from either step 712 or step 714 to step 716, where the system determines whether the user is operating with statement level exceptions. If so, the system sets a statement level exceptions flag (step 719) and continues to step 720 below. Thereafter, the process continues from either step 716 or step 719 to step 720.

Figure 7A:
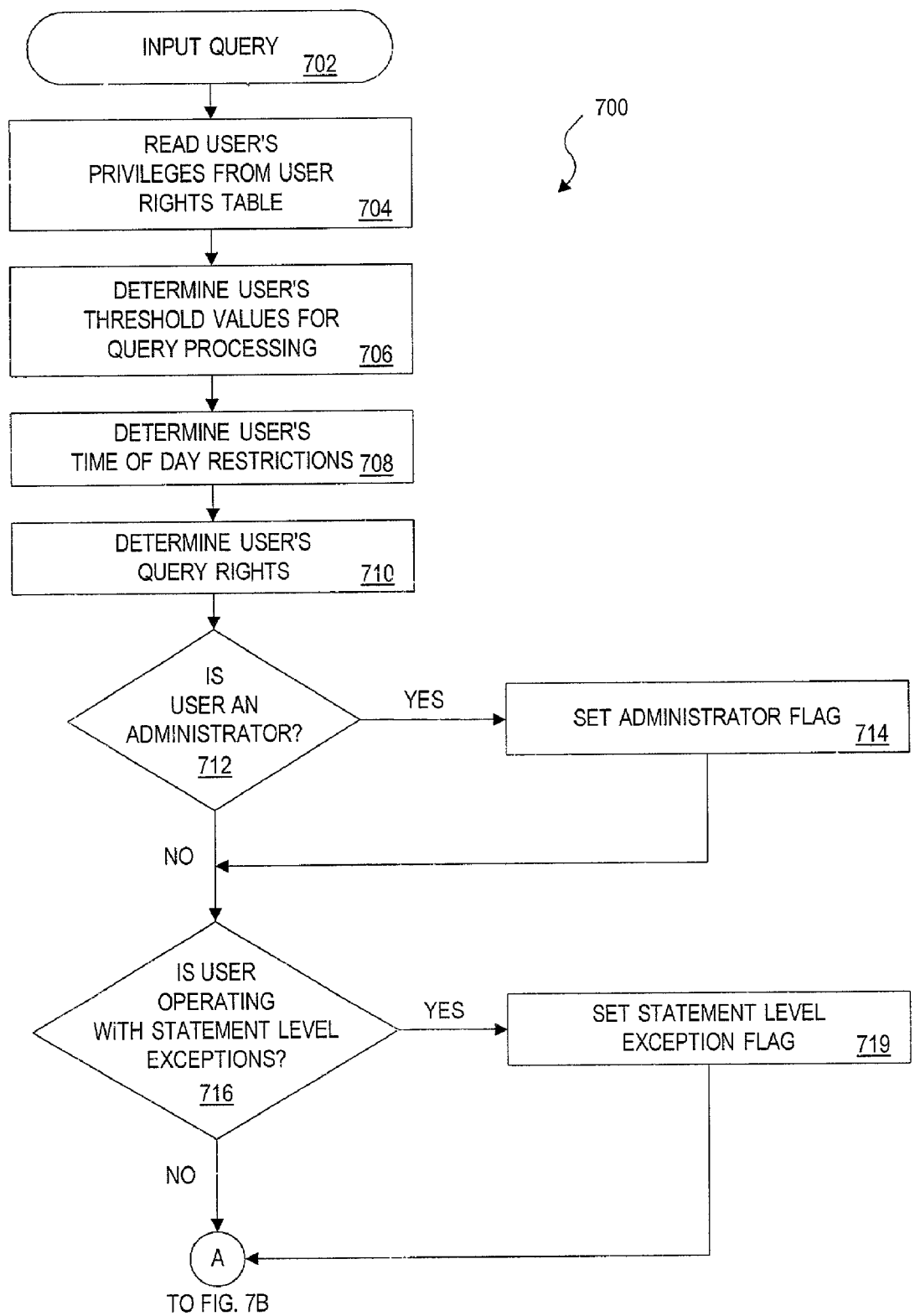
FIGS. 7A–7J are flowcharts depicting an exemplary detailed process for screening queries in accordance with certain embodiments of the present invention.
Figure 7B:
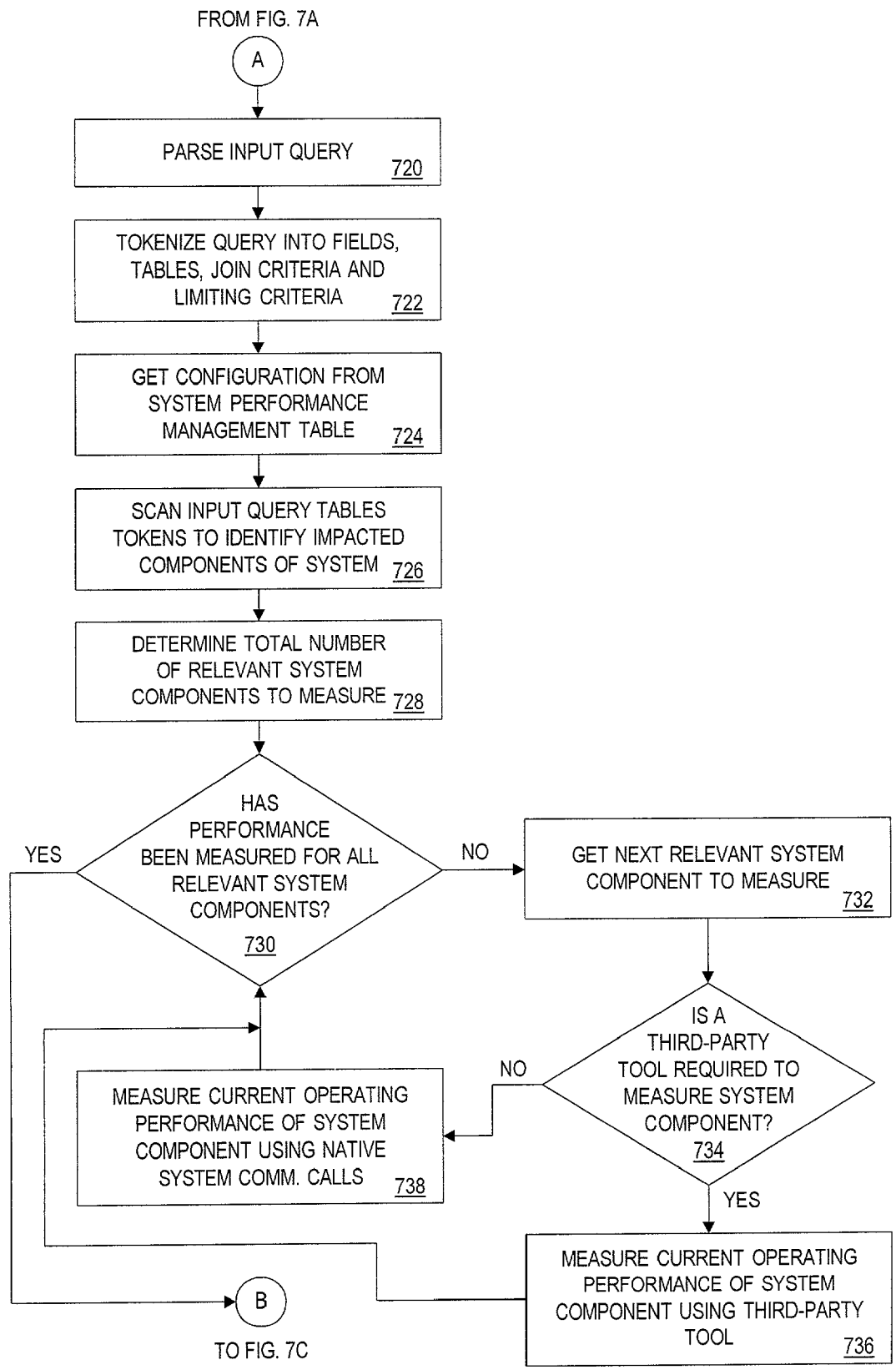

Referring now to FIG. 7B, the system next initiates parsing functions to parse the submitted query (step 720). The query is tokenized into fields, tables, join criteria and limiting criteria (step 722). This parsing, in addition to any flag settings above, will determine, at least in part, the processing cost of the query.

The system next retrieves the database engine configuration, for example by reference to the systems performance management table 116 (step 724). The system next examines the query tokens to identify impacted components of the database engine 204 (step 726) and to determine total number of relevant system components to measure (step 728).

Next, at step 730, the system determines whether performance has been measured for all relevant system components. If so, the process 700 continues to step 740, discussed below with respect to FIG. 7C. Otherwise, the process 700 continues to step 732, discussed immediately below.

The system then selects the next relevant system component to measure (step 732). The system further determines whether a third party tool may be required to measure the selected system component (step 734). If so, the process continues to step 736 where the current operating performance of the system component is measured using the third party software tool. Otherwise, the system component is measured using the native system (step 738). From either step 736 or step 738, the process 700 returns to step 730 above until all relevant system components have been measured.

Figure 7C:
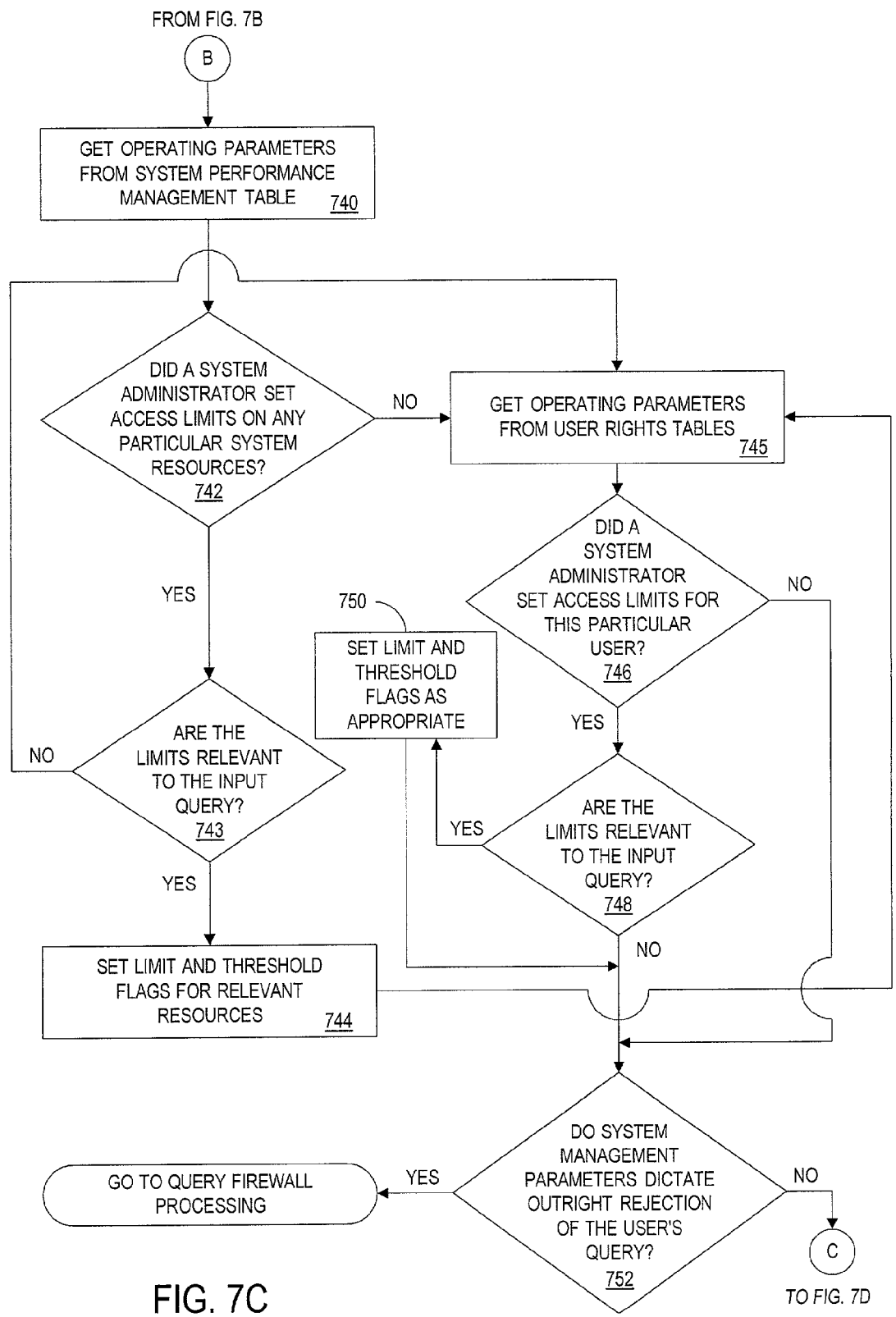

Referring now to FIG. 7C, the process 700 continues with the system next retrieving operating parameters from the system performance management table 116 (step 740). The system next determines whether the database engine administrator set access limits on any of the system resources (step 742). If not, the process 700 continues to step 745 below. If, on the other hand, other limits have been set, the system next determines whether the limits set are relevant to the submitted query (step 743). If not, the process 700 continues to step 745, below. Otherwise, the system sets appropriate threshold flags for the relevant resources (step 744).

The system next determines whether the database engine administrator set access limits for the user, or the group of users to which the user belongs (step 746). If not, the process 700 continues to step 752 below. If, on the other hand, limits have been set, the system next determines whether the limits set are relevant to the submitted query (step 748). If not, the process 700 continues to step 752 below. Otherwise, the system sets appropriate threshold flags for the query (step 750).

The system proceeds to determine whether the system management parameters dictate outright rejection of the user's query (step 752). This might be the case, for example, where current usage of the database engine is at an unacceptably high level. Other analogous conditions may also be used to make this determination. If query rejection is warranted, the process 750 continues to step 852, described below with respect to FIG. 7J. Otherwise, the process 700 continues to step 753.

Figure 7D:
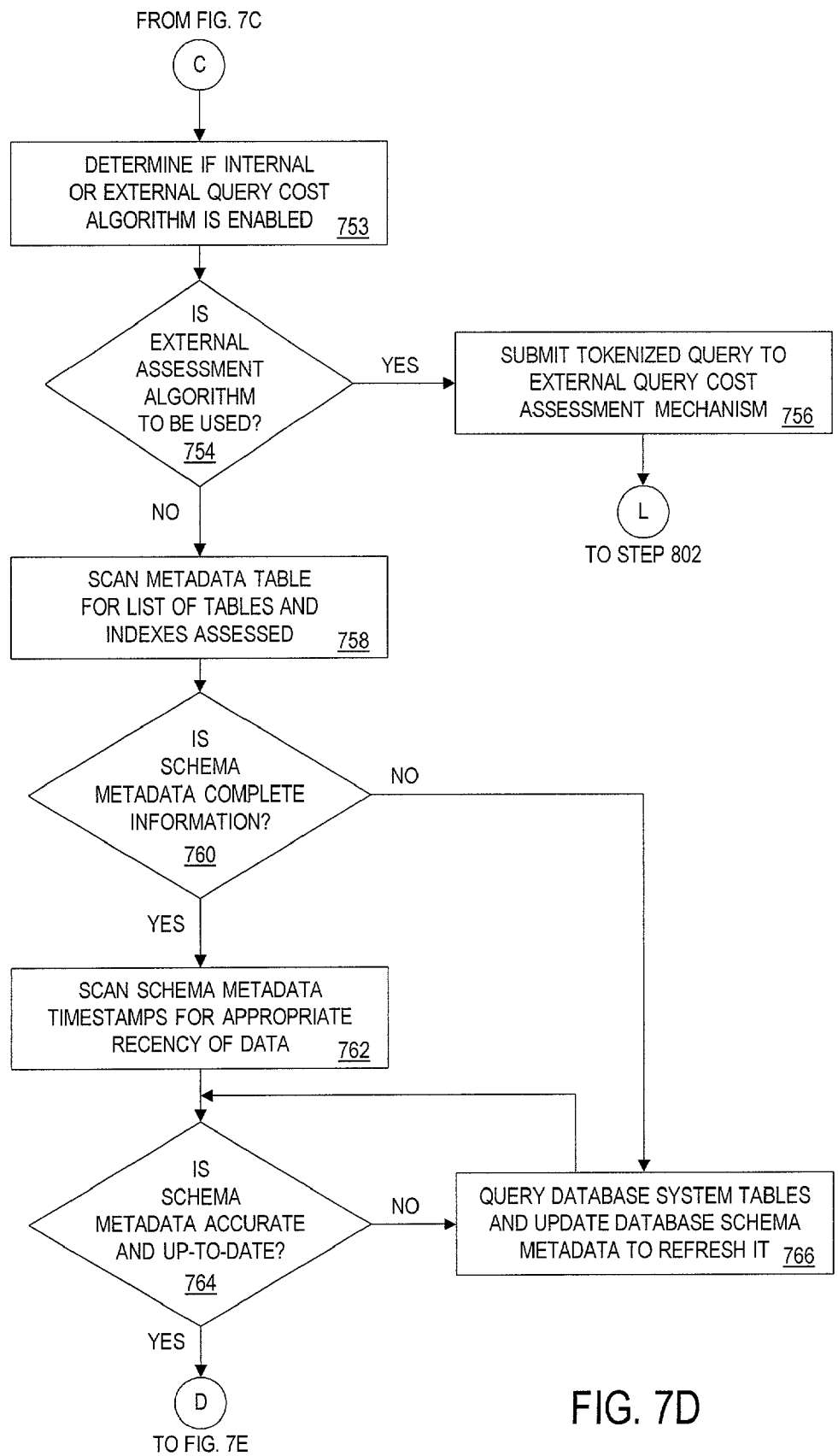

Referring now to FIG. 7D, at step 753, the system determines whether internal or external assessment algorithms are enabled in order to determine query cost. This may be done by referencing appropriate data stored in the systems performance management table 116. If an external algorithm is to be used (step 754), the process 700 continues to step 756, where the tokenized query elements are submitted to the external cost assessment mechanism. From there, the process continues to step 802 discussed below with respect to FIG. 7G. If, on the other hand, an internal assessment algorithm is to be used, the process 700 continues to step 758, discussed immediately below.

The process 700 continues with the system next scanning a metadata table based on the database to be accessed for a list of tables and indices to be accessed to satisfy the submitted query (step 758). The system checks first to determine whether the metadata table is complete (step 760). If so, the process 700 continues to step 762. Otherwise, the process 700 continues to step 766 below.

Next, the system scans schema metadata timestamps (step 762) and confirms that the metadata table is accurate and up-to-date (step 764). Reference may be made to the database engine files 209 and a predetermined time limit set for such records. If the information is accurate and up-to-date, the process 700 continues to step 768 in FIG. 7E. Otherwise, the system queries the database engine files 209 to refresh the metadata table (step 766).

Figure 7E:
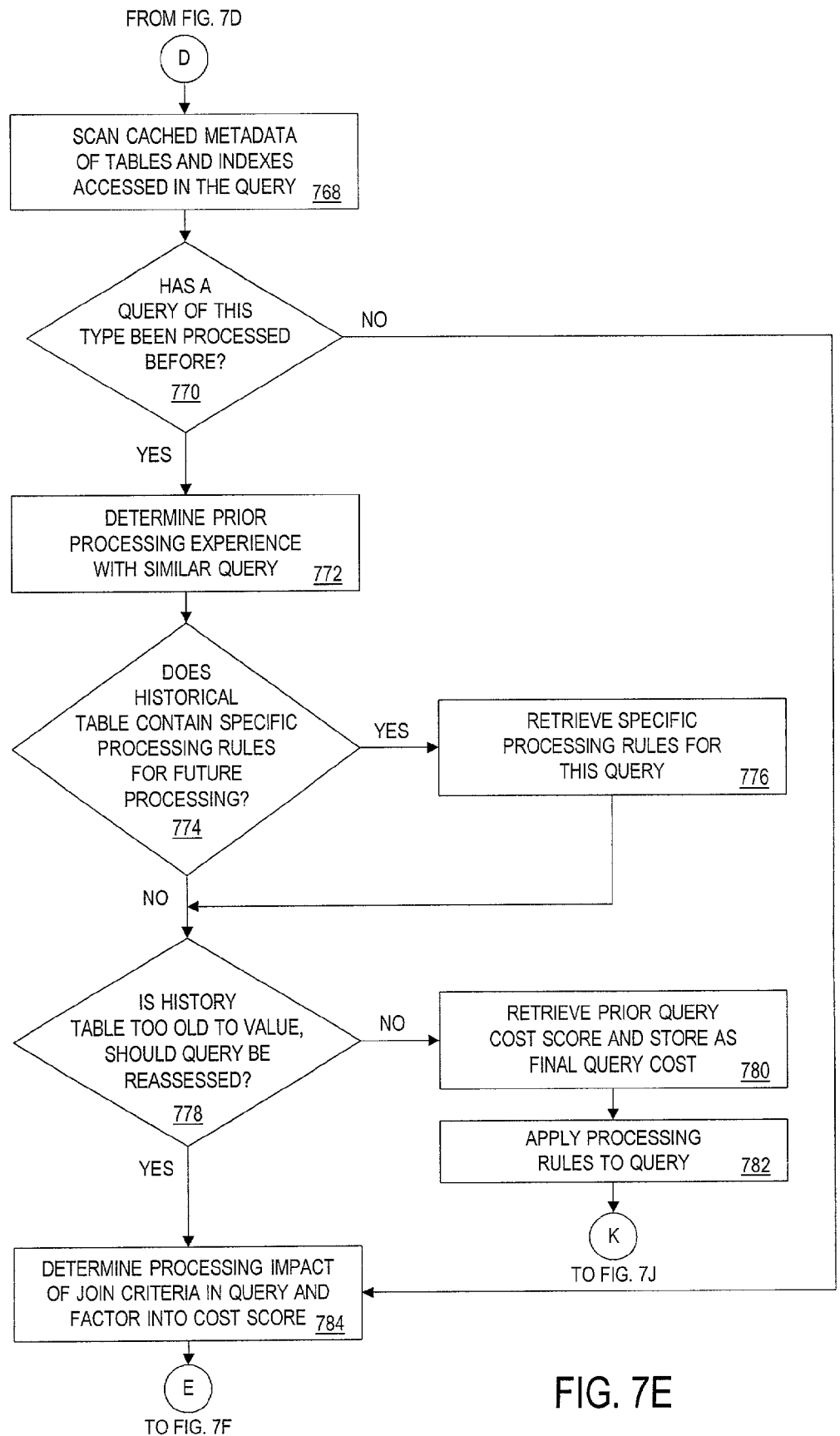

Referring to FIG. 7E, the system next scans the cached metadata of tables and indexes accessed in the query (step 768). The system then determines whether a similar query has been processed before (step 770). The similarity of the query may be based on the number and type of query arguments and search terms employed. Reference to the User and Query Performance History Table 122 may be had to make this determination. If a similar query has been processed before, the process 700 continues to step 772. Otherwise, the process 700 continues to step 784, discussed further below.

At step 772, the system determines the prior processing experience with the similar query. Referencing the table 122, the system further determines whether specific processing rules for handling this type of query have been previously established (step 774). If so, the rules are retrieved from the table 122 (step 776). Otherwise, the process continues to step 778, where the system confirms that the data for the similar query is not stale (based on the age of the stored data and the like) (step 778).

If the data is too old, the process 700 continues to step 784 below. If the data is not too old, the system retrieves the prior query cost score and stores this as an approximate cost of the submitted query (step 780). Thee system then applies the processing rules to query (i.e. transmitting specific query hints to the user for optimization or retrieving a stored, optimized version of query) (step 782). The process then continues to step 850, discussed further below with respect to FIG. 7J. Returning to step 784, continued from either step 770 or step 778 above, the system may next determine the projected processing impact of any join criteria in the query and factor this into the cost score for the query.

Figure 7F:
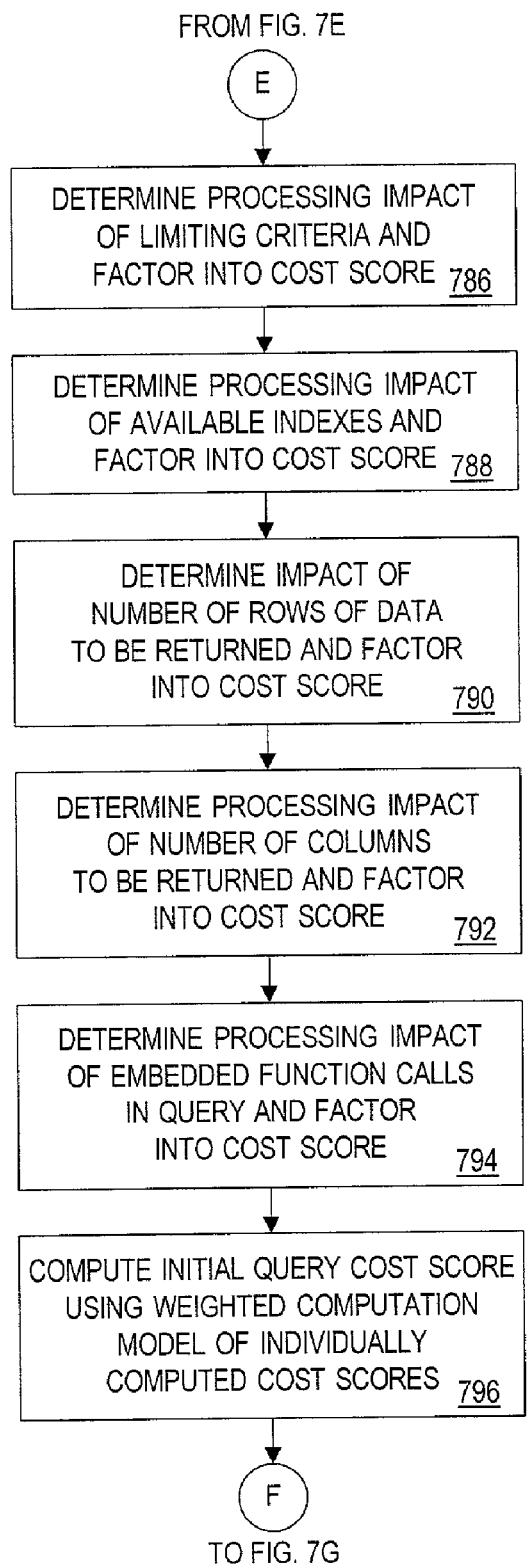

With reference to FIG. 7F, the system further determines processing impact of limiting criteria for queries in general (step 786), the processing impact of available indexes (step 788), the processing impact based on a number of rows of data to be returned (step 790), the processing impact based on the number of columns of data to be returned (step 792) and the processing impact of embedded function calls in the query (step 794).

The system then computes the initial query cost score using a weighted computation model of individually computed cost scores for the projected impacts identified above, in addition to any flags that were set by the system earlier in the process (step 796). The process 700 then continues to step 802 below.

Figure 7G:
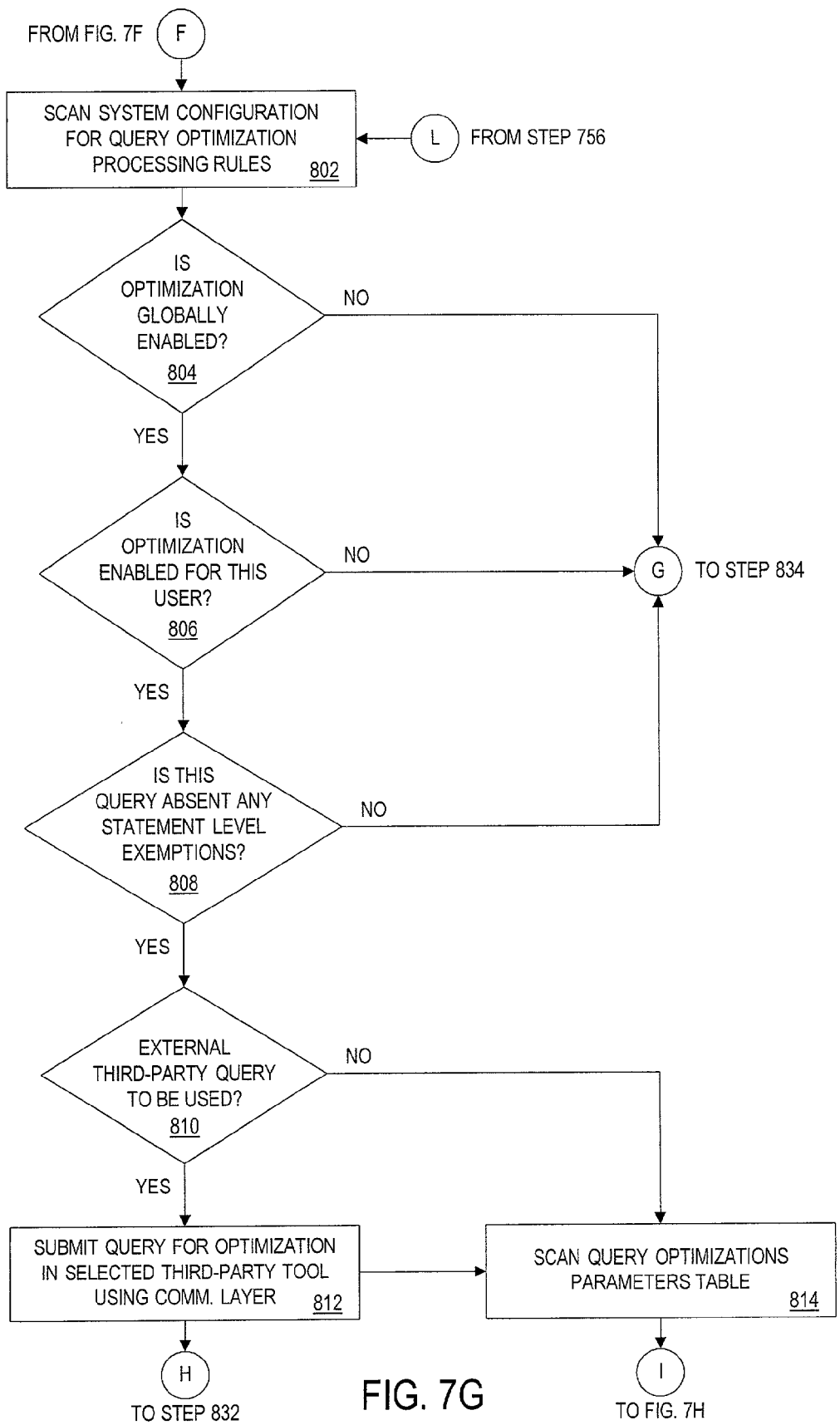

Referring to FIG. 7G, the system next retrieves query optimization processing rules (step 802). The system then first determines if optimization is globally enabled (step 804). If not, the process 700 continues to step 834 below. Otherwise, the system next determines if optimization is enabled for this user (step 806). If not the process continues at step 834 below. Otherwise, the system will further determine whether the query is free of any statement level exceptions (step 808). If not, the process continues to step 834 below. If so, the processor finally determines whether a third party optimization software tool or group of tools is to be employed (step 810). If not, the process continues to step 814. Otherwise, the query is submitted for optimization by one or more selected third party tool using a system communications layer (step 812). After such optimization, the process continues to step 832 discussed further below. In the instance where the process continues to step 814, the system will first scan the query optimization parameters by reference to query optimization parameters table 120.

Figure 7H:
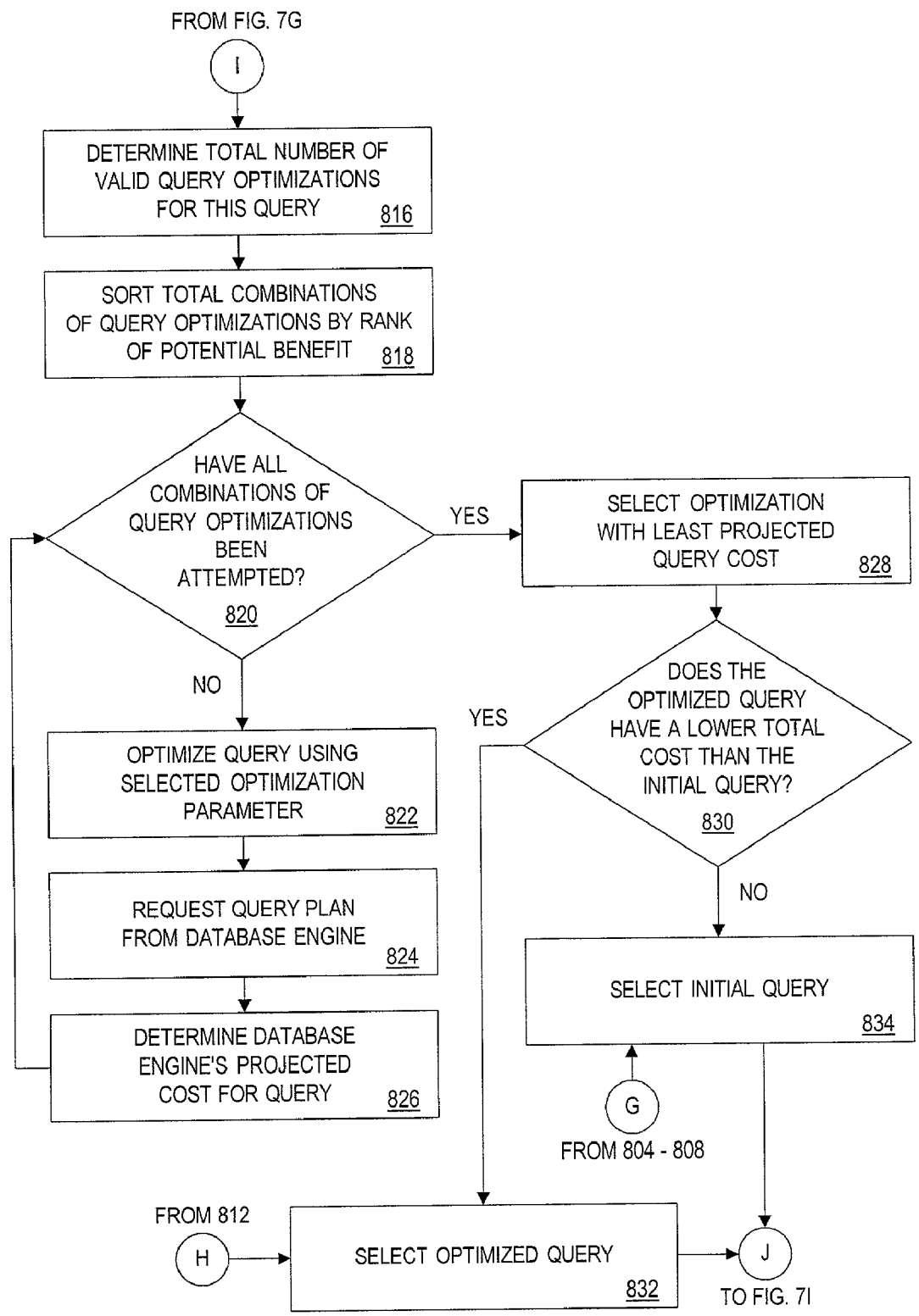

Turning now to FIG. 7H, the system will further determine the total number of valid query optimizations for this query (step 816), sort a total combination of query optimizations by rank of potential benefit, based for example, on query cost (step 818). Then, at step 820, the system will determine whether all combinations of query optimizations been attempted. If not, the process 700 will continue to step 822, where the query is optimized using a selected optimization parameter. The system will then request a query plan from the database engine (step 824) and determine the database engine's projected cost for the query 826, after which the process returns to step 820 above.

From step 820, if all combinations of query optimizations have been attempted, the system will select the optimization with the least projected processing cost (step 828). The system then determines whether the optimized query has a lower total cost than the initial query (step 830). If so, the system will select the optimized query to submit to the database engine 204 (step 832). Otherwise, the system will select the initial query (step 834).

Figure 7I:
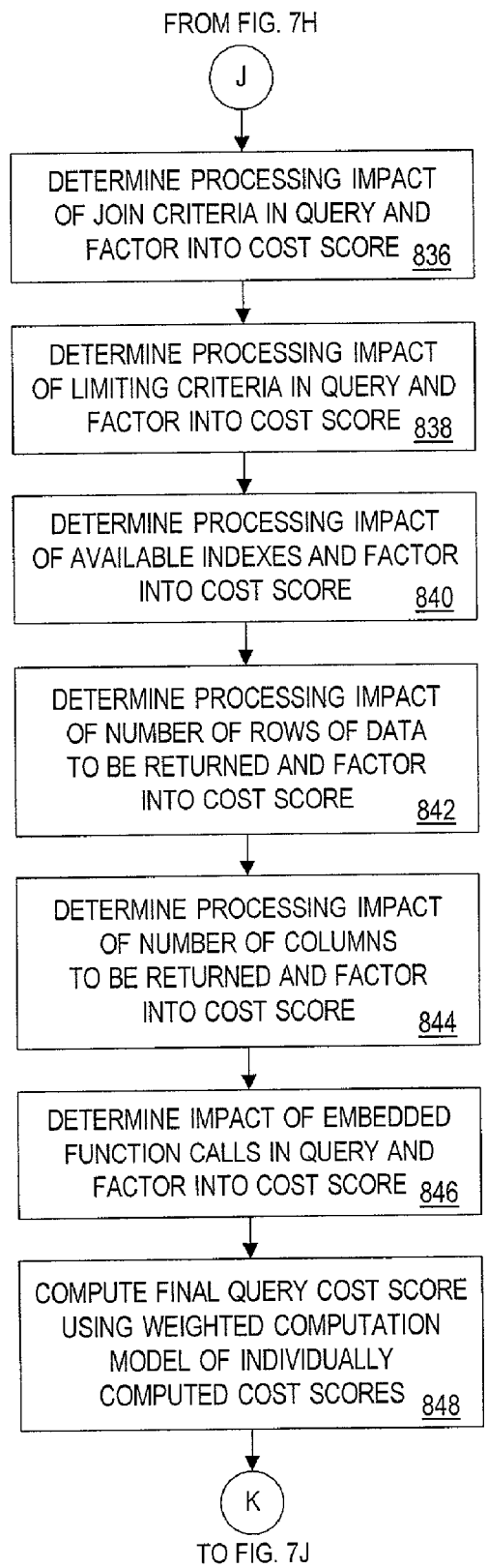

Continuing now with reference to FIG. 7I, from either step 832 or step 834, the system will next determine the processing impact of any join criteria in the query (step 836), determine the processing impact of any other limiting criteria (step 838), determine the projected processing impact of available indexes (step 840), determine the projected processing impact on the number of number of rows of data to be returned for the query (step 842), determine the projected processing impact of the number of columns to be returned for the query (step 844) and determine the projected processing impact of any embedded function calls in the query (step 846). A final cost score of the query is generated based on a weighted computation model in which these cost factors immediately above, along with any flags previously generated, are added in a weighted fashion (i.e. certain factors may be more heavily factored than others) (step 848).

Figure 7J:
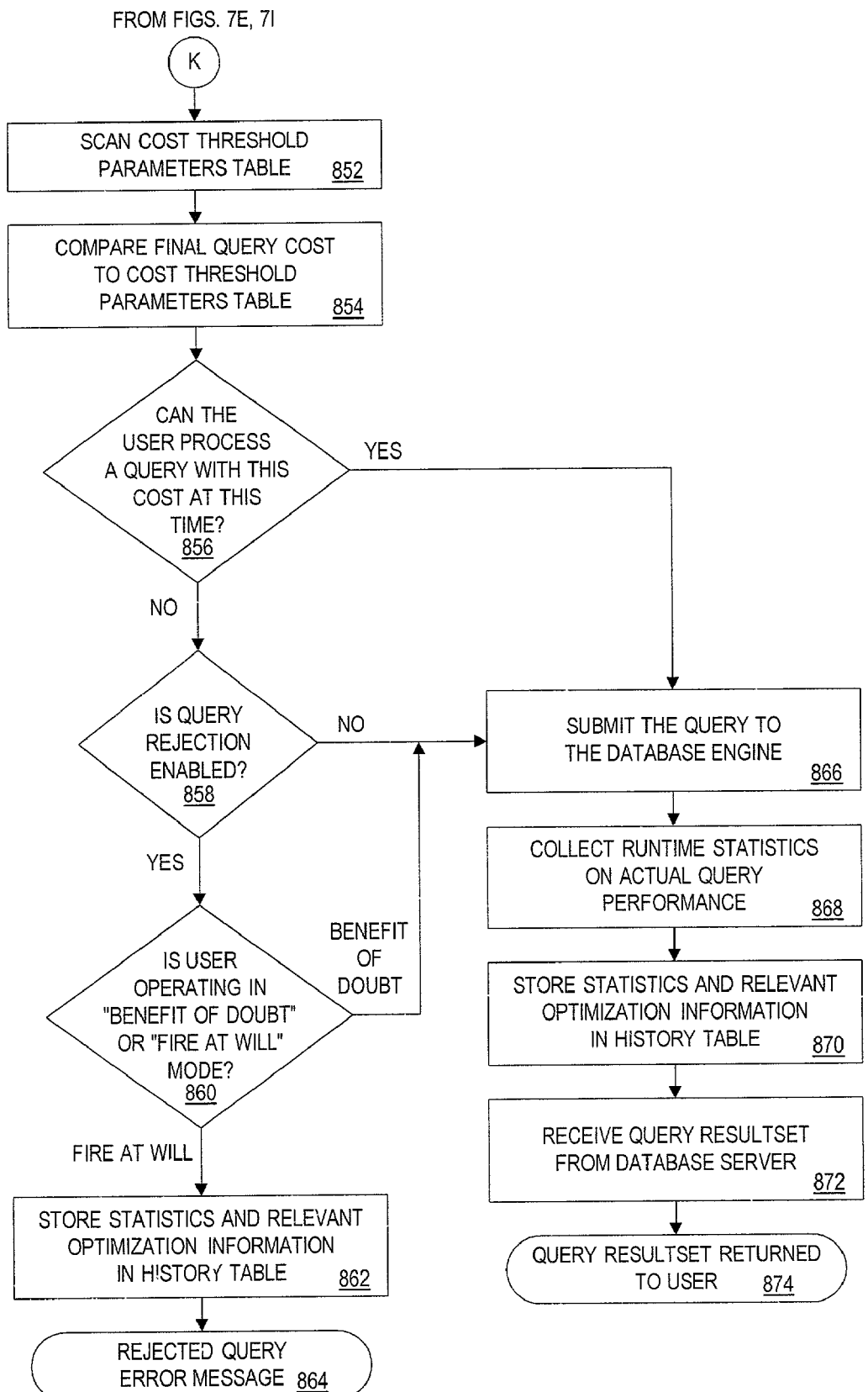

Referring to FIG. 7J, the process 700 continues from step 848 in the following manner. The system will next initiate a query firewall processing routine (step 850). The system scans cost threshold parameters table 118 (step 852) and compares the final query cost to permitted costs established in the cost threshold parameters table 120 (step 854). The system will then determine, based on this comparison, whether the user may process the query with this cost at this time (step 856). If so, the process 700 continues to step 866 below. Otherwise, the process 700 continues at step 858, where the system determines whether query rejection is enabled. If query rejection is not available, the process 700 continues to step 866 below. Otherwise, the system will next determine whether the user is operating in the benefit-of-the-doubt mode or the fire-at-will mode (step 860). If the user is in fire-at-will mode, the process continues to step 862, where the system first stores statistics and relevant optimization information for the query in history table 122 (step 862), after which a query rejection message is sent to the user (step 864). If the user is in benefit-of-the-doubt mode, the process 700 continues to step 866 below.

At step 866, the query is submitted to the database engine 204. The system then collects runtime statistics on actual performance impact of the query (step 868) and stores statistics and relevant optimization information in history table 122 for reference in case future queries of similar type are submitted to the system (step 870). The database engine 204 then returns a query result set in response to the database query (step 872). The result set, or a portion thereof, is then provided to the user (step 874), after which process 700 ends.

While the processes 600 and 700 have been described above with respect to a single user terminal, a single screening server and a single database engine, it is contemplated that any number of such servers may be employed in an operative embodiment of the present invention, as particularly illustrated in the exemplary network configurations of FIGS. 3–5.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for controlling access to database information, comprising:
    receiving a database query directed to a database engine;
    initially evaluating at least one system performance characteristic associated with at least one database engine, selected from one or more of:
        system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and rejecting the query if the system usage surpasses a threshold value.

2. The method of claim 1, wherein said receiving further comprises:

receiving the database query from a user.

3. The method of claim 1, further comprising:

assigning a score to the query based on said evaluating, wherein said rejecting occurs when the score surpasses the threshold value.

4. The method of claim 3, wherein said assigning comprises:

assigning a value to a plurality of system performance variables;

determining a cost of the query based on a weighted evaluation of one or more of said variables.

5. The method of claim 1, further comprising:

storing the query and the determined cost of the query.

6. The method of claim 1, wherein said threshold value is determined based on a category of a user submitting the query.

7. The method of claim 6, wherein the category of the user is determined based on a history of queries submitted by the user.

8. The method of claim 7, wherein said history of queries comprises histories of scores of previous queries submitted by the user.

9. The method of claim 6, wherein the category comprises one of a plurality of categories of increasing accessibility rights to search the database.

10. The method of claim 1, further comprising:

submitting the query to the search engine if the system usage is less than the threshold value.

11. The method of claim 1, wherein said rejecting further comprises:

editing the query so that the system usage is less than the threshold value; and submitting the query to the database engine.

12. The method of claim 11, wherein said editing comprises one or more of:

providing an alternate search parameter, and/or providing a limit on the number of results for the query.

13. The method of claim 11, further comprising:

transmitting a result of the query, after said submitting.

14. The method of claim 13, wherein said transmitting further comprises:

transmitting the result of the query to the user.

15. The method of claim 13, wherein said transmitting further comprises:

transmitting a portion of the result of the query to a user.

16. The method of claim 11, wherein said editing further comprises:

substantially optimizing the query for usage of system resources.

17. The method of claim 11, wherein said submitting comprises:

submitting the query to a second database engine.

18. The method of claim 1, wherein said rejecting comprises:

offering to provide a portion of a result of the rejected query to the user; submitting the rejected query to the server; and providing a portion of the result of the query to the user.

19. The method of claim 1, wherein said rejecting further comprises:

offering an alternative query in place of the rejected query.

20. The method of claim 1, wherein said receiving, evaluating and rejecting are performed by a screening server prior to submission of the query to a database engine.

21. The method of claim 1, wherein the database query comprises structured query language.

22. The method of claim 1, further comprising:

storing the query.

23. A computer readable medium encoded with processing instructions for implementing a method, performed by a computer, for controlling access to database information, the method comprising:

receiving a database query directed to a database engine;

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and rejecting the query if the system usage surpasses a threshold value.

24. An apparatus for controlling access to database information, comprising:
a processor; and
a memory in communication with the processor, the memory for storing a plurality of processing instructions enabling the processor to:
receive a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query;
reject the query if the system usage surpasses a threshold value.

25. A method for controlling access to database information, comprising:
receiving a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
submitting the query to the database engine if the system usage does not surpass a threshold value.

26. The method of claim 25, wherein said receiving further comprises:
receiving the database query from a user.

27. The method of claim 25, further comprising:
assigning a score to the query based on said evaluating, wherein said submitting occurs when the score is less than the threshold value.

28. The method of claim 27, wherein said assigning comprises:
assigning a fixed value to a plurality of system performance variables;
determining a cost of the system query based on a weighted evaluation of each assigned variables.

29. The method of claim 27, further comprising:
storing the query and the determined cost of the query.

30. The method of claim 25, wherein said threshold value is determined based on a category of a user submitting the query.

31. The method of claim 30, wherein the category of the user is determined based on a history of queries submitted by the user.

32. The method of claim 31, wherein said history of queries comprises histories of scores of previous queries submitted by the user.

33. The method of claim 30, wherein the category comprises one of a plurality of categories of increasing accessibility rights to search the database.

34. The method of claim 25, further comprising:
rejecting the query if the system usage surpasses the threshold value.

35. The method of claim 34, wherein said rejecting comprises:
offering to provide a portion of a result of the rejected query to the user; submitting the rejected query to the server; and
providing a portion of the result of the query to the user.

36. The method of claim 34, further comprising:
offering an alternative query to the user after said rejecting.

37. The method of claim 25, further comprising:
editing the query if the system usage surpasses the threshold value.

38. The method of claim 37, wherein said editing further comprises one or more of:
providing an alternate search parameter, and/or providing a limit on the number of results for the query.

39. The method of claim 25, further comprising:
transmitting a result of the search after said submitting.

40. The method of claim 25, wherein said receiving, evaluating and submitting are performed by a screening server that receives queries directed to a database engine.

41. The method of claim 25, wherein the database query comprises structured query language.

42. The method of claim 25, further comprising:
storing the query.

43. A computer-readable medium encoded with processing instructions for implementing a method, performed by a computer, for controlling access to database information, the method comprising:
receiving a database query directed to a database engine;

initially evaluating at least one system performance characteristic associated with at least one database engine, selected from one or more of:
  system management parameters of said at least one database engine, said system management parameters comprising one or more of estimated processor usage, estimated memory usage, input/output resource usage and/or disk resource usage for a system maintaining the database engine to process the query;
  a user-access record of said at least one database engine, said user-access record comprising an assigned accessibility right of a user based on a class or category of a user, historical system resource requirements of the user's previous queries and the user's previously evaluated queries; and
  the query to determine system usage of said at least one database engine, prior to submission of the query to the database engine, said evaluating of the database query based on one or more of:
    a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
submitting the query to the database engine if the system usage does not surpass a threshold value.

44. An apparatus for controlling access to database information, comprising:
a processor; and
a memory in communication with the processor, the memory for storing a plurality of processing instructions directing the processor to:
receive a database query directed to a database engine;
initially evaluating at least one system performance characteristic associated with at least one database engine, selected from one or more of:
  system management parameters of said at least one database engine, said system management parameters comprising one or more of estimated processor usage, estimated memory usage, input/output resource usage and/or disk resource usage for a system maintaining the database engine to process the query;
  a user-access record of said at least one database engine, said user-access record comprising an assigned accessibility right of a user based on a class or category of a user, historical system resource requirements of the user's previous queries and the user's previously evaluated queries; and
  the query to determine system usage of said at least one database engine, prior to submission of the query to the database engine, said evaluating of the database query based on one or more of:
    a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
submit the query to the database engine if the system usage does not surpass a threshold value.

45. A method for controlling access to database information, comprising:
receiving a database query directed to a database engine;
initially evaluating at least one system performance characteristic associated with at least one database engine, selected from one or more of:
  system management parameters of said at least one database engine, said system management parameters comprising one or more of estimated processor usage, estimated memory usage, input/output resource usage and/or disk resource usage for a system maintaining the database engine to process the query;
  a user-access record of said at least one database engine, said user-access record comprising an assigned accessibility right of a user based on a class or category of a user, historical system resource requirements of the user's previous queries and the user's previously evaluated queries; and
  the query to determine system usage of said at least one database engine, prior to submission of the query to the database engine, said evaluating of the database query based on one or more of:
    a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
editing the query if the system usage surpasses a threshold value.

46. The method of claim 45, wherein said receiving further comprises:
receiving the database query from a user.

47. The method of claim 45, further comprising:
assigning a score to the query based on said evaluating, wherein said rejecting occurs when the score surpasses the threshold value.

48. The method of claim 47, wherein said assigning comprises:
assigning a value to a plurality of system performance variables;
determining a cost of the system query based on a weighted evaluation of one or more of said variables.

49. The method of claim 47, further comprising:
storing the query and the determined cost of the query.

50. The method of claim 45, wherein said threshold value is determined based on a category of a user submitting the query.

51. The method of claim 50, wherein the category of the user is determined based on a history of queries submitted by the user.

52. The method of claim 51, wherein said history of queries comprises histories of scores of previous queries submitted by the user.

53. The method of claim 50, wherein the category comprises one of a plurality of categories of increasing accessibility rights to search the database.

54. The method of claim 45, wherein said editing further comprises one or more of:
providing an alternate search parameter, and/or providing a limit on the number of results for the query.

55. The method of claim 54, further comprising:
submitting the query to the database engine after said editing.

56. The method of claim 55, further comprising:
transmitting a result of the query after said submitting.

57. The method of claim 45, further comprising:
submitting the edited query to the database engine if the system usage surpasses a threshold value; and
transmitting a result based on the query after said submitting.

58. The method of claim 45, wherein said receiving, evaluating and editing are performed by a screening server that intercepts queries directed to a database engine.

59. The method of claim 45, wherein said editing further comprises:
substantially optimizing the query for usage of system resources.

60. The method of claim 45, wherein said editing comprises:
offering to provide a portion of a result of the rejected query to the user; submitting the rejected query to the server; and
providing a portion of the result of the query to the user.

61. The method of claim 45, wherein the database query comprises structured query language.

62. The method of claim 45, further comprising:
storing the query.

63. A computer-readable medium encoded with processing instructions for implementing a method, performed by a computer, for controlling access to database information, the method comprising:
receiving a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
editing the query if the system usage surpasses a threshold value.

64. An apparatus for controlling access to database information, comprising:
a processor; and
a memory in communication with the processor, the memory for storing a plurality of processing instructions directing the processor to:
receive a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
edit the query if the system usage surpasses a threshold value.

65. A method for controlling access to database information, comprising:
receiving a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and if the system usage surpasses a threshold value, performing one or more of the following: submitting the query to the database engine with a limit on a number of returns responsive to the query, editing the query, and/or rejecting the query.

66. The method of claim 65, wherein said receiving further comprises:
receiving the database query from a user.

67. The method of claim 65, further comprising:
assigning a score to the query based on said evaluating, wherein said rejecting occurs when the score surpasses the threshold value.

68. The method of claim 67, wherein said assigning comprises:
assigning a fixed value to a plurality of system performance variables;
determining a cost of the system query based on a weighted evaluation of each assigned variables.

69. The method of claim 67, further comprising:
storing the query and the determined cost of the query.

70. The method of claim 65, wherein said threshold value is determined based on a category of a user submitting the query.

71. The method of claim 70, wherein the category of the user is determined based on a history of queries submitted by the user.

72. The method of claim 71, wherein said history of queries comprises histories of scores of previous queries submitted by the user.

73. The method of claim 70, wherein the category comprises one of a plurality of categories of increasing accessibility rights to search the database.

74. The method of claim 65, wherein said editing comprises one or more of:
providing an alternate search parameter, and/or providing a limit on the number of results for the query.

75. The method of claim 65, further comprises:
submitting the query to the database engine if the system usage is less than the threshold value.

76. The method of claim 65, further comprising:
determining a result based on the query; and
transmitting the result to a party from which the query originated.

77. The method of claim 65, wherein said receiving, evaluating and editing are performed by a screening server that intercepts queries directed to a database engine.

78. The method of claim 65, wherein said editing further comprises:
substantially optimizing the query for usage of system resources.

79. The method of claim 65, wherein said rejecting comprises:
offering to provide a portion of a result of the rejected query to the user; submitting the rejected query to the server; and
providing a portion of the result of the query to the user.

80. The method of claim 65, wherein the database query comprises structured query language.

81. A computer-readable medium encoded with processing instructions for implementing a method, performed by a computer, for controlling access to database information, the method comprising:
receiving a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
if the system usage surpasses a threshold value, performing one or more of the following: submitting the query to the database engine with a limit on a number of returns responsive to the query, editing the query, and/or rejecting the query.

82. An apparatus for controlling access to database information, comprising:
a processor; and
a memory in communication with the processor, the memory for storing a plurality of processing instructions directing the processor to:
receive a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and perform one or more of the following, if the system usage surpasses a threshold value: submit the query to the database engine with a limit on a number of returns responsive to the query, edit the query, and/or reject the query.

83. A method for querying a database, comprising:

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query;

transmitting a query to a search engine; and receiving one of: a rejection of the query and a revised search criterion, prior to receiving a search result based on the query.

84. A method for querying a database, comprising:

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query;

transmitting a query to a database engine; and receiving one of: a rejection of the query and a revised search criterion, prior to submission of the query to the database engine.

85. A method for selectively controlling queries to a database comprising:

establishing a threshold value for system usage for a database query;

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query;

if the system usage surpasses the threshold value, a query screening process performs one or more of the following: the query is submitted to the database engine with a limit on a number of returns responsive to the query, the query is edited, and/or the query is rejected.

86. The method of claim 85, wherein the database query comprises structured query language.

87. A computer-readable medium encoded with processing instructions for implementing a method, performed by a computer, for selectively controlling queries to a database, the method comprising:

establishing a threshold value for system usage for a database query;

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query;

if the system usage surpasses the threshold value, a query screening process performs one or more of the following: the query is submitted to the database engine with a limit on a number of returns responsive to the query, the query is edited, and/or the query is rejected.

88. An apparatus for selectively controlling queries to a database, comprising:

a processor; and a memory in communication with the processor, the memory for storing a plurality of processing instructions directing the processor to:

establish a threshold value for system usage for a database query;

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query;

if the system usage surpasses the threshold value, a query screening process performs one or more of the following: the query is submitted to the database engine with a limit on a number of returns responsive to the query, the query is edited, and/or the query is rejected.

89. A method for controlling access to database information performed by a screening server, comprising:

receiving, from a user terminal, a database query directed to a database engine;

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the database query to determine system usage of the query at the database engine, prior to submission of the query to the database engine, said evaluating of the database query based on one or more of:

a parameter of the query, a number of relational databases for the query, a size of a data field to be searched for the query, an availability of resources of a system maintaining the database engine, a number of relational database tables to be employed for the query, a limitation imposed on a size of a query result set, a number of columns of data to be returned in a query result set, a cost of a similar stored query and/or a number of function calls for the query;

determining a threshold value for system usage of the database engine, wherein the threshold value is based on one or more of: estimated processor usage, estimated memory usage, input/output resource usage and disk resource usage of the database engine; and/or if the system usage surpasses a threshold value, performing one or more of the following: submitting the query to the database engine with a limit on a number of returns responsive to the query, editing the query, and/or rejecting the query.

90. The method of claim 89, further comprising:

monitoring the actual system usage of the query after submission to the database engine; and storing the database query and the actual system usage.

91. A method for controlling access to database information performed by a screening server, comprising:

receiving, from a user terminal, a structured query language (SQL) query directed to a separate database engine;

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the database query to determine system usage of the query at the database engine, prior to submission of the query to the database engine, said evaluating of the database query based on one or more of:

a parameter of the SQL query, a number of relational databases for the SQL query, a size of a data field to be searched for the SQL query, an availability of resources of the database engine, a number of relational database tables to be employed for the SQL query, a limitation imposed on a size of a query result set, a number of columns of data to be returned in a query result set, a cost of a similar stored SQL query and/or a number of function calls for the query;

determining a threshold value for system usage of the database engine, wherein the threshold value is based on one or more of: estimated processor usage, estimated memory usage, input/output resource usage and/or disk resource usage of the database engine;

if the system usage surpasses a threshold value, performing one or more of the following: submitting the SQL query to the database engine with a limit on a number of returns responsive to the SQL query, editing the SQL query, and/or rejecting the SQL query;

monitoring the actual system usage of the SQL query after submission to the database engine; and storing the SQL query and the actual system usage.

92. The computer-readable medium of claim 23, further comprising:

assigning a score to the query based on said evaluating, wherein said rejecting occurs when the score surpasses the threshold value.

93. The computer-readable medium of claim 23, wherein said assigning comprises:

assigning a value to a plurality of system performance variables;

determining a cost of the query based on a weighted evaluation of one or more of said variables.

94. The computer-readable medium of claim 23, further comprising:

storing the query and the determined cost of the query.

95. The computer-readable medium of claim 23, further comprising:

submitting the query to the search engine if the system usage is less than the threshold value.

96. The computer-readable medium of claim 23, wherein said rejecting further comprises:

editing the query so that the system usage is less than the threshold value; and submitting the query to the database engine.

97. The computer-readable medium of claim 23, wherein said editing comprises one or more of:

providing an alternate search parameter, and/or providing a limit on the number of results for the query.

98. The computer-readable medium of claim 96, further comprising:

transmitting a result of the query, after said submitting.

99. The apparatus of claim 24, wherein said threshold value is determined based on a category of a user submitting the query.

100. The apparatus of claim 99, wherein the category of the user is determined based on a history of queries submitted by the user.

101. The apparatus of claim 100, wherein said history of queries comprises histories of scores of previous queries submitted by the user.

102. The apparatus of claim 99, wherein the category comprises one of a plurality of categories of increasing accessibility rights to search the database.

103. A system for screening queries on a query-by-query basis, comprising:

receiving a database query directed to a database engine;

initially evaluating at least one system performance characteristic associated with at least one database engine, selected from one or more of:

system management parameters of said at least one database engine, said system management parameters comprising one or more of estimated processor usage, estimated memory usage, input/output resource usage and/or disk resource usage for a system maintaining the database engine to process the query;

a user-access record of said at least one database engine, said user-access record comprising an assigned accessibility right of a user based on a class or category of a user, historical system resource requirements of the user's previous queries and the user's previously evaluated queries; and the query to determine system usage of said at least one database engine, prior to submission of the query to the database engine, said evaluating of the database query based on one or more of:

a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and rejecting said query if the system usage surpasses a threshold value.

104. The system of claim 103, wherein said receiving further comprises:

receiving the database query from a user.

105. The system of claim 103, further comprising:

submitting the query to the search engine if the system usage is less than the threshold value.

106. The system of claim 103, wherein said rejecting further comprises:

editing the query so that the system usage is less than the threshold value; and submitting the query to the database engine.

107. The system of claim 106, wherein said editing comprises one or more of:

providing an alternate search parameter, and/or providing a limit on the number of results for the query.

108. The system of claim 106, further comprising:

transmitting a result of the query, after said submitting.

109. The system of claim 108, wherein said transmitting further comprises:

transmitting a portion of the result of the query to a user.

110. The system of claim 106, wherein said editing further comprises:
    substantially optimizing the query for usage of system resources.

111. The system of claim 106, wherein said submitting comprises:
    submitting the query to a second database engine.

112. The system of claim 103, wherein said rejecting comprises:
    offering to provide a portion of a result of the rejected query to the user;
    submitting the rejected query to the server; and
    providing a portion of the result of the query to the user.

113. The system of claim 103, wherein said rejecting further comprises:
    offering an alternative query in place of the rejected query.

114. The system of claim 103, wherein said receiving, evaluating and rejecting are performed by a screening server prior to submission of the query to a database engine.

115. The system of claim 103, wherein the database query comprises structured query language.

116. The system of claim 103, further comprising:
    storing the query.

117. The computer-readable medium of claim 43, further comprising:
    rejecting the query if the system usage surpasses the threshold value.

118. The computer-readable medium of claim 117, wherein said rejecting further comprises:
    offering to provide a portion of a result of the rejected query to the user; submitting the rejected query to the server; and providing a portion of the result of the query to the user.

119. The computer-readable medium of claim 117, further comprising:
    offering an alternative query to the user after said rejecting.

120. The computer-readable medium of claim 43, further comprising:
    editing the query if the system usage surpasses the threshold value.

121. The computer-readable medium of claim 120, wherein said editing further comprises one or more of:
    providing an alternate search parameter, and/or providing a limit on the number of results for the query.

122. The computer-readable medium of claim 43, further comprising:
    transmitting a result of the search after said submitting.

123. The apparatus of claim 44, wherein said threshold value is determined based on a category of a user submitting the query.

124. The apparatus of claim 123, wherein the category comprises one of a plurality of categories of increasing accessibility rights to search the database.

125. The apparatus of claim 44, further comprising means for rejecting the query if the system usage surpasses the threshold value.

126. A system for screening queries on a query-by-query basis, comprising:
    receiving a database query directed to a database engine;
    initially evaluating at least one system performance characteristic associated with at least one database engine, selected from one or more of:
        system management parameters of said at least one database engine, said system management parameters comprising one or more of estimated processor usage, estimated memory usage, input/output resource usage and/or disk resource usage for a system maintaining the database engine to process the query;
        a user-access record of said at least one database engine, said user-access record comprising an assigned accessibility right of a user based on a class or category of a user, historical system resource requirements of the user's previous queries and the user's previously evaluated queries; and
    the query to determine system usage of said at least one database engine, prior to submission of the query to the database engine, said evaluating of the database query based on one or more of:
        a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
    submitting said query to the database engine if the system usage does not surpass a threshold value.

127. The system of claim 126, wherein said receiving further comprises:
    receiving the database query from a user.

128. The system of claim 126, further comprising:
    editing the query if the system usage surpasses the threshold value.

129. The system of claim 128, wherein said editing further comprises one or more of:
    providing an alternate search parameter, and/or providing a limit on the number of results for the query.

130. The system of claim 126, further comprising:
    transmitting a result of the search after said submitting.

131. The system of claim 126, wherein said receiving, evaluating and submitting are performed by a screening server that receives queries directed to a database engine.

132. The computer-readable medium of claim 63, further comprising:
    assigning a score to the query based on said evaluating, wherein said rejecting occurs when the score surpasses the threshold value.

133. The computer-readable medium of claim 132, wherein said assigning comprises:
    assigning a value to a plurality of system performance variables;
    determining a cost of the based on a weighted evaluation of one or more of said variables.

134. The computer-readable medium of claim 63, further comprising:
    storing the query and the determined cost of the query.

135. The computer-readable medium of claim 63, wherein said receiving, evaluating and editing are performed by a screening server that intercepts queries directed to a database engine.

136. The computer-readable medium of claim 63, wherein said editing further comprises:
    substantially optimizing the query for usage of system resources.

137. The computer-readable medium of claim 63, wherein said editing comprises:
    offering to provide a portion of a result of the rejected query to the user; submitting the rejected query to the server; and
    providing a portion of the result of the query to the user.

138. The apparatus of claim 64, wherein said threshold value is determined based on a category of a user submitting the query.

139. The apparatus of claim 138, wherein the category of the user is determined based on a history of queries submitted by the user.

140. The apparatus of claim 139, wherein said history of queries comprises histories of scores of previous queries submitted by the user.

141. The apparatus of claim 139, wherein the category comprises one of a plurality of categories of increasing accessibility rights to search the database.

142. A system for screening queries on a query-by-query basis, comprising:
receiving a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
editing said query if the system usage surpasses a threshold value.

143. The system of claim 142, wherein said receiving further comprises:
receiving the database query from a user.

144. The system of claim 142, wherein said editing further comprises one or more of:
providing an alternate search parameter, and/or providing a limit on the number of results for the query.

145. The computer-readable medium of claim 81, further comprising:
assigning a score to the query based on said evaluating, wherein said rejecting occurs when the score surpasses the threshold value.

146. The computer-readable medium of claim 145, wherein said assigning comprises:
assigning a fixed value to a plurality of system performance variables;
determining a cost of the system query based on a weighted evaluation of each assigned variables.

147. The computer-readable medium of claim 145, further comprising:
storing the query and the determined cost of the query.

148. The computer-readable medium of claim 81, wherein said editing comprises one or more of:
providing an alternate search parameter, and providing a limit on the number of results for the query.

149. A system for screening queries on a query-by-query basis, comprising:
receiving a database query directed to a database engine;
initially evaluating at least one system performance characteristic associated with at least one database engine, selected from one or more of:
system management parameters of said at least one database engine, said system management parameters comprising one or more of estimated processor usage, estimated memory usage, input/output resource usage and/or disk resource usage for a system maintaining the database engine to process the query;
a user-access record of said at least one database engine, said user-access record comprising an assigned accessibility right of a user based on a class or category of a user, historical system resource requirements of the user's previous queries and the user's previously evaluated queries; and
the query to determine system usage of said at least one database engine, prior to submission of the query to the database engine, said evaluating of the database query based on one or more of:
a parameter of the query, a number of relational databases for the query, a size of a data field to be searched for the query, an availability of resources of the database engine, a number of relational database tables to be employed for the query, a limitation imposed on a size of a query result set, a number of columns of data to be returned in a query result set, a cost of a similar stored query and/or a number of function calls for the query; and
performing one or more of the following: submitting the query to the database engine with a limit on a number of returns responsive to the query, editing the query, and rejecting the query.

150. The system of claim 149, wherein said receiving further comprises:
receiving the database query from a user.

151. The system of claim 149, wherein said receiving, evaluating and editing are performed by a screening server that intercepts queries directed to a database engine.

152. The system of claim 149, wherein said editing further comprises:
substantially optimizing the query for usage of system resources.

153. The system of claim 149, wherein said rejecting comprises:
offering to provide a portion of a result of the rejected query to the user; submitting the rejected query to the server; and
providing a portion of the result of the query to the user.

* * * * *

UNITED STATES PATENT AND TRADEMARK OFFICE
CERTIFICATE OF CORRECTION

PATENT NO.         : 7,058,622 B1                                     Page 1 of 1
APPLICATION NO. : 10/034885
DATED              : June 6, 2006
INVENTOR(S)       : Michael A. Tedesco It is certified that error appears in the above-identified patent and that said Letters Patent is hereby corrected as shown below:

Column 24, Claim 85, line 21, after "database query;" insert -- and --

Column 24, Claim 85, line 52, delete "a" and insert -- the --

Column 24, Claim 87, line 64, after "database query;" insert -- and --

Column 25, Claim 87, line 27, delete "a" and insert -- the --

Column 25, Claim 88, line 39, after "database query;" insert -- and --

Column 26, Claim 88, line 3, delete "a" and insert -- the --

Signed and Sealed this

Fourteenth Day of November, 2006

JON W. DUDAS
*Director of the United States Patent and Trademark Office*